United States Patent
Kim et al.

(10) Patent No.: US 8,437,331 B2
(45) Date of Patent: May 7, 2013

(54) METHOD AND APPARATUS FOR TRANSMITTING BROADCAST SIGNAL IN A TRANSMITTER

(75) Inventors: Jin Woo Kim, Seoul (KR); Byoung Gill Kim, Seoul (KR); Won Gyu Song, Seoul (KR); Hyoung Gon Lee, Seoul (KR); Jae Hyung Song, Seoul (KR); In Hwan Choi, Seoul (KR); Chul Kyu Mun, Seoul (KR)

(73) Assignee: LG Electronics Inc., Seoul (KR)

( * ) Notice: Subject to any disclaimer, the term of this patent is extended or adjusted under 35 U.S.C. 154(b) by 419 days.

(21) Appl. No.: 12/841,060

(22) Filed: Jul. 21, 2010

(65) Prior Publication Data
US 2011/0044316 A1     Feb. 24, 2011

Related U.S. Application Data

(60) Provisional application No. 61/228,157, filed on Jul. 23, 2009.

(51) Int. Cl.
*H04B 7/00*     (2006.01)
*H04J 3/00*     (2006.01)
*H04J 3/16*     (2006.01)
*H04L 12/28*     (2006.01)

(52) U.S. Cl.
USPC ............ 370/345; 370/310; 370/431; 370/471

(58) Field of Classification Search .................. 370/310, 370/345, 431, 471
See application file for complete search history.

(56) References Cited

U.S. PATENT DOCUMENTS

| | | | | |
|---|---|---|---|---|
| 6,233,251 | B1 * | 5/2001 | Kurobe et al. | 370/471 |
| 2008/0089407 | A1 * | 4/2008 | Kim et al. | 375/240.01 |

* cited by examiner

*Primary Examiner* — Michael Thier
*Assistant Examiner* — Yaotang Wang
(74) *Attorney, Agent, or Firm* — Lee, Hong, Degerman, Kang & Waimey

(57) ABSTRACT

A method and apparatus for transmitting a broadcast signal in a transmitter are disclosed. The apparatus includes an RS encoder 212 configured to encode mobile data for forward error correction (FEC), a group formatter 214 configured to form a data group using (or including) the encoded mobile data and known data sequence, a packet formatter 216 configured to form a specified number of mobile data packets and a first scalable number of mobile data packets by using the data included in the data group, a packet multiplexer (MUX) 120 configured to multiplex the formed mobile data packets and a second scalable number of main data packets, a data interleaver 1502 configured to interleave data of the multiplexed data packets, and a transmission unit 170 configured to transmit the interleaved data. Herein, the known data are spotted in the interleaved data.

10 Claims, 17 Drawing Sheets

METHOD AND APPARATUS FOR TRANSMITTING BROADCAST SIGNAL IN A TRANSMITTER

CROSS-REFERENCE TO RELATED APPLICATIONS

Pursuant to 35 U.S.C. §119(e), this application claims the benefit of U.S. Provisional Application No. 61/228,157, filed on Jul. 23, 2009, the contents of which are hereby incorporated by reference herein in their entirety.

BACKGROUND OF THE INVENTION

1. Field of the Invention

The present invention relates to a method and apparatus for transmitting a broadcast signal in a transmitter.

2. Discussion of the Related Art

The Vestigial Sideband (VSB) transmission mode, which is adopted as the standard for digital broadcasting in North America and the Republic of Korea, is a system using a single carrier method. Therefore, the receiving performance of the digital broadcast receiving system may be deteriorated in a poor channel environment. Particularly, since resistance to changes in channels and noise is more highly required when using portable and/or mobile broadcast receivers, the receiving performance may be even more deteriorated when transmitting mobile service data by the VSB transmission mode.

SUMMARY OF THE INVENTION

Accordingly, the present invention is directed to an apparatus and method for transmitting a broadcast signal in a transmitter that substantially obviate one or more problems due to limitations and disadvantages of the related art.

An object of the present invention is to provide a method for transmitting digital broadcast that can create a mobile service data group, and that can use data included in the created mobile service data group when forming a mobile data packet, and that can add a specified number of scalable mobile data packets, thereby realizing full channel capability when transmitting mobile data. Since the added specified number of mobile data packets may scalably vary depending upon the intentions of the system designer, the entire packets may be allocated for mobile data, or a portion of the packets may be allocated for main data. By doing so, since a full channel bandwidth may be used, the mobile data transmitting performance may be enhanced.

Another object of the present invention is to insert known data sequences within a mobile data group, when configuring the mobile data group. The known data sequence corresponds to data agreed upon in advance by the transmitting system and the receiving system. According to the present invention, the known data sequence may be inserted based upon the intentions of the system designer, without being limited to a specific region of the mobile data group.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, an apparatus for transmitting a broadcast signal in a transmitter includes an RS encoder 212 configured to encode mobile data for forward error correction (FEC), a group formatter 214 configured to form a data group using (or including) the encoded mobile data and known data sequence, a packet formatter 216 configured to form a specified number of mobile data packets and a first scalable number of mobile data packets by using the data included in the data group, a packet multiplexer (MUX) 120 configured to multiplex the formed mobile data packets and a second scalable number of main data packets, a data interleaver 1502 configured to interleave data of the multiplexed data packets, and a transmission unit 170 configured to transmit the interleaved data. Herein, the known data are spotted (or dispersed in the form of spots) in the interleaved data.

Also, a sum of the first scalable number and the second scalable number may be fixed to a specified value. And, various values may be used herein depending upon the intentions of the system designer. According to the embodiment of the present invention, the second scalable number may be equal to '9' or '0' (zero).

Additionally, according to the embodiment of the present invention, when the second scalable number is '9', the apparatus may further include a data randomizer 1500 configured to randomize main data of the main data packets and known data, and an RS encoder 1501 configured to perform systematic Reed-Solomon (RS) encoding on the main data and to perform non-systematic RS encoding on the mobile data. However, when the second scalable number is '0', since there is no influence of the main data, the data randomizer 1500 and the RS encoder 1501 may pass over (or by-pass) randomizing, RS encoding, and non-systematic RS encoding processes.

Furthermore, the data group of the present invention may include placeholders for MPEG header, non-systematic RS parity, and main data. Herein, when the second scalable number is '0', the placeholders shall be allocated to the encoded mobile data. In this case, since the transmitting system entirely transmits the mobile data only, a full channel capability may be realized.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
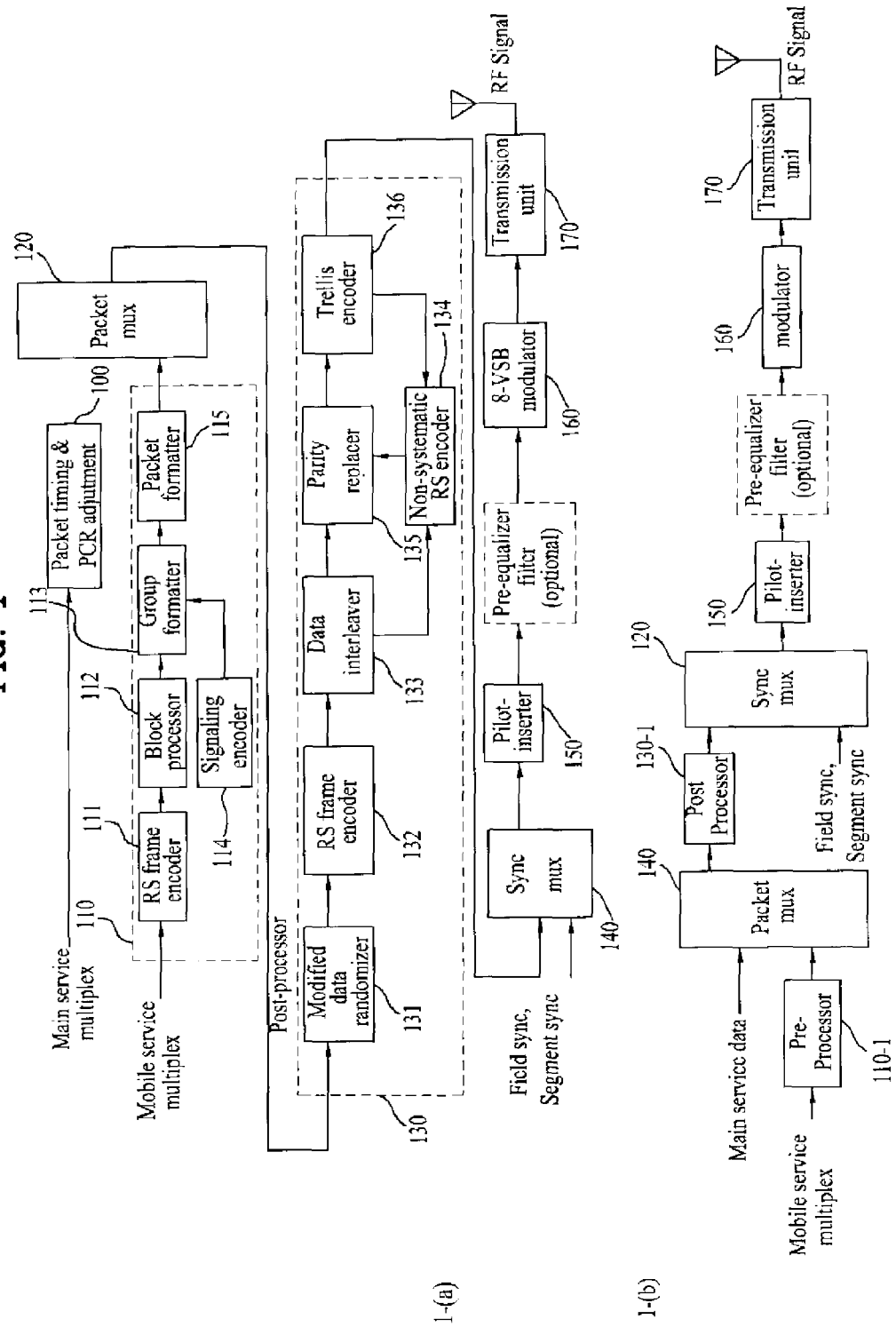
FIG. 1 illustrates a block view of a transmitting system according to a first embodiment of the present invention.

Although the terms used in the present invention are selected from generally known and used terms, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meaning of each term lying within.

Among the terms used in the description of the present invention, main data correspond to data that can be received by the conventional fixed-type receiving system and may include audio/video (A/V) data. More specifically, the main data may include A/V data of high definition (HD) or standard definition (SD) levels and may also include diverse data types required for data broadcasting. Also, the known data sequences (or known data) correspond to data pre-known according to a pre-arranged agreement between the receiving system and the transmitting system.

Among the terms used in the description of the present invention, M/H (or MH) corresponds to the first letters (or abbreviation) of the terms 'mobile' and 'handheld', thereby corresponding to an opposite concept of 'fixed'. Also, the M/H service data may include at least one of mobile service data and handheld service data. Herein, the M/H service data may also be referred to as mobile service data (or mobile data) for simplicity. At this point, not only M/H service data but also any one type of mobile or portable (or handheld) service data may be included in the M/H service data. Therefore, the mobile service data will not be limited only to the M/H service data.

The above-described mobile service data may correspond to data having information, such as program execution files, stock information, and so on, and may also correspond to A/V data. Most particularly, the mobile service data may correspond to A/V data having lower resolution and lower data rate as compared to the main service data. For example, if an A/V codec that is used for a conventional main service corresponds to a MPEG-2 codec, a MPEG-4 advanced video coding (AVC) or scalable video coding (SVC) having better image compression efficiency may be used as the A/V codec for the mobile service. Furthermore, any type of data may be transmitted as the mobile service data. For example, transport protocol expert group (TPEG) data for broadcasting real-time transportation information may be serviced as the main service data.

Also, a data service using the mobile service data may include weather forecast services, traffic information services, stock information services, viewer participation quiz programs, real-time polls & surveys, interactive education broadcast programs, gaming services, services providing information on synopsis, character, background music, and filming sites of soap operas or series, services providing information on past match scores and player profiles and achievements, and services providing information on product information and programs classified by service, medium, time, and theme enabling purchase orders to be processed. Herein, the present invention is not limited only to the services mentioned above.

Reference will now be made in detail to the preferred embodiments of the present invention, examples of which are illustrated in the accompanying drawings. Wherever possible, the same reference numbers will be used throughout the drawings to refer to the same or like parts.

FIG. 1 illustrates a block view of a transmitting system according to a first embodiment of the present invention.

As shown in 1-(a) of FIG. 1, the transmitting system broadly includes a Packet Timing & PCR Adjustment 100 receiving main data, a Pre-Processor 110 pre-processing mobile service data, a packet multiplexer (MUX) 120, a Post-Processor 130, a Sync multiplexer (MUX) 140, a Pilot Inserter 150, a modulator 160, and a transmission unit 170. Since a displacement of a packet including mobile service data become different from the displacement of a packet not including any mobile data during a time-division process, the Packet Timing & PCR Adjustment 100 is included to compensate such difference in displacement.

The Pre-Processor 110 performs additional encoding on the mobile service data being inputted. The mobile service data being processed by the Pre-Processor 110 may swiftly and robustly respond to noise and change in channel. The Pre-Processor 110 may include a Reed-Solomon (RS) frame encoder 111, a Block processor 112, a signaling encoder 113, a group formatter 114, and a packet formatter 115.

The Reed-Solomon (RS) frame encoder 111 may configure (or form) least one RS frame after data-randomizing the mobile service data. Also, depending upon the number of RS frames, a plurality of RS frame encoders may be included.

The main function of a Block processor 112 is an outer-encoding of the SCCC for the output of the RS Frame encoder 111. The operations of the Block processor 112 include RS Frame Portion to SCCC Block conversion, byte-to-bit conversion, convolutional encoding, symbol interleaving, symbol-to-byte conversion and SCCC Block to mobile data Block conversion.

The Group formatter 113 maps the FEC coded mobile service data from the Block processor 112 into the corresponding mobile data Blocks of a Group, adds the pre-determined training data bytes, adds the PCCC-encoded signaling data, and the data bytes to be used for initializing the trellis encoder memories (TCM). It also inserts placeholder bytes for main data, MPEG-2 headers and non-systematic RS parity, and some dummy data bytes to complete construction of the intended Group format.

The signaling encoder 114 may perform Forward Error Correction (FEC) encoding on the signaling information being inserted in the data group, which is generated from the group formatter 113. Herein, the signaling information may include a Transmission Parameter Channel (TPC) and a Fast Information Channel (FIC).

The Packet Formatter 115 is the last process in the pre-processor 100. The packet formatter 115 shall first remove the main data place holders and the RS parity place holders.

The packet formatter 115 next shall replace the 3-bytes MPEG header place holder with an MPEG header having a packet PID. An MPEG TS sync byte is then inserted before each 187-byte data packet. Therefore, the packet formatter 115 may output 118 mobile-data-encapsulating TS packets per group.

The Post-processor 130 performs post-processing in order to modulate the main data according to the VSB method. The receiver may differentiate (or identify) and process the pre-processed mobile service data and main data multiplexed by the packet multiplexer (MUX) 120 of the transmitter.

The Post-processor 130 a modified data randomizer 131, an RS encoder 132, a Data interleaver 133, a non-systematic RS encoder 134, a parity replacer 135, and a Trellis Encoding Module 136.

The modified data randomizer 131 is the first block of the post-processor. The modified randomizer 131 performs data-randomizing on the main service data and the MPEG header and may allow the data-randomizing on the mobile service data to be bypassed.

Furthermore, only a portion of the mobile service data packet may be randomized. For example, when the pre-processor 110 performs randomizing in advance on the mobile service data, the data randomizer 131 may discard (or delete) the synchronization byte among the 4-byte MPEG header included in the mobile service data packet and may perform randomizing only on the remaining 3 bytes, thereby outputting the randomized 3 bytes to the RS encoder 132. More specifically, with the exception of the MPEG header, the remaining portion of the data may be outputted to the RS encoder 132 without being randomized. Also, the data randomizer 131 may or may not perform randomizing on the known data sequence, TCM initialization data placeholder, and signaling data, which are included in the mobile service data packet.

The RS encoder 132 performs RS-encoding on the data randomized by the modified data randomizer 131 or the data bypassing the modified data randomizer 131, so as to add 20 bytes of RS parity to the corresponding data, thereby outputting the processed data to the data interleaver 133.

If the inputted data corresponds to a main data packet, the RS encoder shall perform the same systematic RS encoding process, adding 20 bytes of RS FEC data at the end of each of these 187-byte packets. If the inputted data corresponds to a mobile service data packet, the RS encoder shall perform a non-systematic RS encoding process. In this case, 20 bytes of RS FEC data obtained from the non-systematic RS encoding process shall be inserted in a pre-determined parity byte location within each mobile data packet.

The Data interleaver 133 receives the data outputted from the RS encoder 132, and, then, the Data interleaver 133 may convolutionally interleave the data in byte units. The output of the data interleaver 133 is inputted to the non systematic RS encoder 134 and the parity replacer 135.

In order to process the data outputted from the Trellis Encoding Module 136, which is positioned in a further end of the parity replacer 135, in to known data sequence defined based upon an agreement between the transmitting end and the receiving end, the memory included in the Trellis Encoding Module 136 is required to be initialized.

Depending upon the state of the Trellis Encoding Module 136, the value of the initialization data is decided, and the initialization data are generated accordingly. The generated initialization data are inputted to the Trellis Encoding Module 136 instead of the TCM initialization placeholder (i.e., substituting the TCM initialization placeholder).

Therefore, due to the influence of the substituted initialization data, a process of recalculating the RS parity and replacing the RS parity being outputted from the data interleaver 133 with the newly calculated RS parity is required.

The Non-systematic RS encoder 134 receives a mobile service data packet including the TCM initialization placeholder, which is to be replaced with the initialization data by the data interleaver 133, and the Non-systematic RS encoder 134 also receives initialization data from the Trellis Encoding Module 136. Among the data of the inputted mobile service data packet, the TCM initialization placeholder may be replaced with the initialization data, and non-systematic RS encoding may be performed on the mobile service data packet. Thereafter, the mobile service data packet is outputted to the parity replacer 135.

If the data outputted from the data interleaver 133 correspond to data included in the main data packet, or if the data outputted from the data interleaver 133 correspond to data included in a mobile service data packet, which does not include a TCM initialization placeholder that is to be replaced, the parity replacer 135 selects the output data of the data interleaver 133 and outputs the selected data to the Trellis Encoding Module 136. Alternatively, if the data outputted from the data interleaver 133 correspond to data included in a mobile service data packet including a TCM initialization placeholder, the parity replacer 135 selects the data outputted from the non-systematic RS encoder 134 and outputs the selected data to the Trellis Encoding Module 136.

The Trellis Encoding Module 136 includes 12 trellis encoders and converts the byte-unit data being outputted from the parity replacer 135 into symbol-unit data. Then, the Trellis Encoding Module 136 performs a 12-way interleaving process on the converted data so as to Trellis-encoding the 12-way interleaved data, thereby outputting the processed data to the sync multiplexer (MUX) 140.

The sync MUX 140 inserts a field sync and a segment sync, which are outputted from the Trellis Encoding Module 136, in the received data, thereby outputting the processed data to the pilot inserter 150. The pilot inserter 150 inserts a pilot signal in the data outputted from the sync MUX 140.

The modulator 160 may modulate the data outputted from the pilot inserter 150 in a VSB method. Thereafter, the transmission unit 170 transmits the signal modulated by the modulator 160 to the receiver.

1-(b) of FIG. 1 corresponds to another exemplary embodiment of 1-(a). The transmitting system of 1-(b) may include a pre-processor 110-1, a packet multiplexer (MUX) 120, a post-processor 130-1, a sync multiplexer (MUX) 140, a pilot inserter 150, a modulator 160, and a transmission unit 170. The pre-processor 110-1 and the post-processor 130-1 respectively perform the same functions as those of the pre-processor 110 and the post-processor 130 shown in 1-(a). However, the pre-processor 110-1 and the post-processor 130-1 of 1-(b) may be configured differently. The packet MUX 120, the sync MUX 140, the pilot inserter 150, the modulator 160, and the transmission unit 170 are identical to those shown in 1-(*a*).

Figure 2:
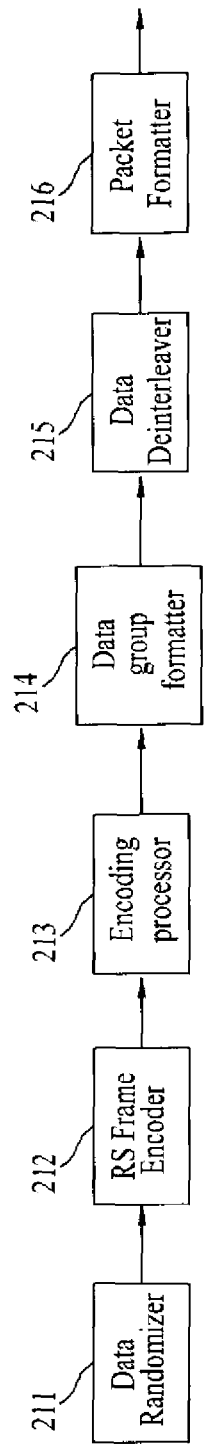
FIG. 2 illustrates a block view of a pre-processor according to an embodiment of the present invention.

FIG. 2 illustrates a block view of a pre-processor 110 according to an embodiment of the present invention. Herein, the pre-processor 110 may include a data randomizer 211, an RS frame encoder 212, an encoding processor 213, a data group formatter 214, a data deinterleaver 215, and a packet formatter 216.

The data randomizer 211 performs randomizing on the mobile service data of the inputted mobile service data packets. Then, the data randomizer 211 outputs the randomized data to the RS frame encoder 212.

At this point, the data randomizer 211 may perform data randomizing only on the mobile service data. Therefore, the data randomizer of the Post-processor 130 may omit the process of randomizing the mobile service data. The data randomizer 211 may perform randomizing after discarding (or deleting) the sync bytes included in the mobile service data packets. Alternatively, the data randomizer 211 may perform randomizing without discarding the sync bytes. This is an option that may be selected by the system designer. According to an embodiment of the present invention, the randomizing process is performed without discarding the sync bytes included in the corresponding mobile service data packets.

The RS frame encoder 212 groups a plurality of mobile the synchronization byte within the mobile service data packets that is randomized and inputted, so as to create an RS frame payload. Then, the RS frame encoder 212 performs at least one of an error correction encoding process and an error detection encoding process in RS frame payload units. Accordingly, through this process, robustness may be provided to the mobile service data, thereby scattering (or distributing or dispersing) group error that may occur during changes in a frequency environment, thereby enabling the enhanced data to respond to the frequency environment, which is extremely vulnerable and liable to frequent changes.

As an example of the present invention, in the RS frame encoder 212, RS-encoding is applied as the error correction encoding process, and cyclic redundancy check (CRC) encoding is applied as the error detection process. When performing the RS-encoding process, parity data that are used for the error correction process are generated. And, when performing the CRC encoding process, CRC data that are used for the error detection process are generated.

The RS encoding process is one of forward error correction (FEC) methods. The FEC corresponds to a technique for compensating errors that occur during the transmission process. The CRC data generated by CRC encoding may be used for indicating whether or not the mobile service data have been damaged by the errors while being transmitted through the channel. In the present invention, a variety of error detection coding methods other than the CRC encoding method may be used, or the error correction coding method may be used to enhance the overall error correction ability of the receiving system.

More specifically, the RS frame encoder 212 first divides (or segments) the inputted mobile service data bytes to units of a predetermined length. Herein, the predetermined length is decided by the system designer. And, in the example of the present invention, the predetermined length is equal to 187 bytes, and, therefore, the 187-byte unit will be referred to as a packet for simplicity.

For example, when the mobile service data that are being inputted correspond to a MPEG transport packet stream configured of 188-byte units, the first synchronization byte is removed, so as to configure (or form) a 187-byte unit. Herein, the synchronization byte is removed because each mobile service data packet has the same value. Meanwhile, if the input data of the RS frame are not configured in an MPEG TS packet format, the RS frame may be configured by reading the data in 187-byte units without the process of removing (or deleting) the MPEG sync byte.

More specifically, N number of packets configured of 187 bytes, as described above, is grouped to configure an RS frame payload. At this point, the RS frame payload is configured by sequentially inserting 187-byte packets in a row direction in an RS frame payload having the size of N(row)*187(column) bytes. Herein, each of the N number of columns included in the RS frame payload includes 187 bytes.

In this case, a ($N_c$,$K_c$)-RS encoding process is performed on each column, so as to generate $N_c$−$K_c$(=P) number of parity bytes. Then, the newly generated P number of parity bytes is added after the very last byte of the corresponding column, thereby creating a column of (187+P) bytes. Herein, $K_c$ is equal to 187 (i.e., $K_c$=187), and $N_c$ is equal to 187+P (i.e., $N_c$=187+P). For example, when P is equal to 48, (235, 187)-RS encoding process is performed, so as to create a column of 235 bytes. When such RS encoding process is performed on all N number of columns, an RS frame having the size of N(row)*(187+P) (column) bytes may be created.

At this point, each row of the RS frame payload is configured of N bytes. However, depending upon channel conditions between the transmitting system and the receiving system, error may be included in the RS frame. When errors occur as described above, CRC data (or CRC code or CRC checksum) may be used on each row unit in order to verify whether an error exists in each row unit.

The RS frame encoder 212 may perform CRC encoding on the mobile service data being RS encoded so as to create (or generate) the CRC data. The CRC data being generated by CRC encoding may be used to indicate whether the mobile service data have been damaged while being transmitted through the channel.

For example, when a 2-byte checksum is added to each row, an RS frame having the size of N+2(row)*(187+P)(column) bytes may be configured. The data of the RS frame configured by the RS frame encoder 212 are outputted to the encoding processor 213. The encoding processor 213 performs encoding at a coding rate of 1/H (i.e., 1/H-rate encoding) on the data being outputted from the RS frame encoder 212. Then, the encoding processor 213 may output the 1/H-rate encoded data to the data group formatter 214.

More specifically, the encoding processor 213 divides the data being inputted in byte units into bit units. Then, 1 bit is encoded to H number of bits. Thereafter, the encoded bits are converted back to byte units and then outputted. For example, if 1 bit of the input data is coded to 2 bits and outputted, then H is equal to 2 (i.e., H=2). Alternatively, if 1 bit of the input data is coded to 4 bits and outputted, then H is equal to 4 (i.e., H=4). Hereinafter, the former coding rate may be referred to as a coding rate of 1/2 (1/2-rate coding), and the latter coding rate may be referred to as a coding rate of 1/4 (1/4-rate coding), for simplicity.

The encoding processor 213 may encode the mobile service data, which are to be inserted in each region in a later process, based upon the characteristics of the regions included in the data group configured by the data group formatter 214, at another coding rate.

The data group formatter 214 gathers the encoded data, the known data sequence placeholder, the TCM initialization placeholder for initializing the Trellis Encoding Module, the signaling data placeholder, the MPEG header placeholder, the RS parity placeholder, and the main data placeholder, so as to configure a data structure for transmitting mobile service data, thereby outputting the configured data structure by group units. Hereinafter, the outputted group unit may be referred to as a data group or a mobile service data group.

Thereafter, among the known data sequence placeholder, the TCM initialization placeholder, the signaling data placeholder, the MPEG header placeholder, the RS parity placeholder, and the main data placeholder, when the data deinterleaved with the mobile service data are multiplexed with the data deinterleaved with the main service data, the main service data may be inserted in the main service data placeholder.

Actual data corresponding to each placeholder are inserted in each placeholder. For example, the packet formatter 215 may insert an actual MPEG header having a PID for differentiating the mobile service data. Also, depending upon the intention of the system designer, mobile data may be inserted in the place of each placeholder so as to create a mobile service data group.

The output of the data group formatter 214 is inputted to the data deinterleaver 215. The data deinterleaver 215 performs deinterleaving on the encoded data outputted from the data group formatter 214 and on each placeholder, as an inverse process of data interleaving, thereby outputting the processed data to the packet formatter 216. The packet formatter 216 may use the inputted deinterleaved data so as to create (or configure) 118+x number of mobile service data packets, thereby outputting the created 118+x number of mobile service data packets. Herein, the number of packets may vary depending upon the intentions of the system designer.

The packet formatter 216 removes the RS parity placeholder, which was assigned for the deinterleaving process, from the inputted deinterleaved data. Subsequently, the packet formatter 216 inserts a 4-byte MPEG header having a null packet PID (or a unique PID that is not used in the main data packet) in the MPEG header placeholder of the M/H service data packet. Herein, the null packet PID (or a unique PID that is not used in the main data packet) is assigned to the mobile service data packet for the following reason. By reading the PID, the conventional receiving system, which cannot receive data for mobile services, may be capable of discarding (or deleting) the data for mobile services without having to process the corresponding data.

Furthermore, in case the packet formatter 216 inserts the known data sequence placeholder and the TCM initialization placeholder in the data group, known data sequences and TCM initialization data may be inserted in the known data sequence placeholder and the TCM initialization placeholder. This function may also be performed by the trellis encoding module 136 of the post-processor 130. Alternatively, in case the replacement insertion is performed in a later process, the packet formatter 216 may directly output the known data sequence placeholder without any modification.

Also, the packet formatter 216 may insert signaling data to the signaling data placeholder. The signaling data may be encoded by a separate encoding process, so as to be inputted to the packet formatter 216. The characteristics of the mobile service data group and the mobile service data packet will be described in detail in the following description.

The packet MUX 120 multiplexes the mobile service data packets and the main data packets. Since a main data placeholder or an MPEG header placeholder is included in the mobile service data packet being outputted from the packet formatter 216, main data may actually be inserted in the main service placeholder.

Therefore, the packet MUX 120 receives the 4-byte MPEG header and the 184-byte main data, and, then, the packet MUX 120 may insert the 4-byte MPEG header in the MPEG header placeholder included in the main data packet and may insert the 184-byte main data in the main data placeholder included in the main data packet. Hereinafter, the output of the packet MUX 120 is provided to the post-processor 130.

Figure 3:
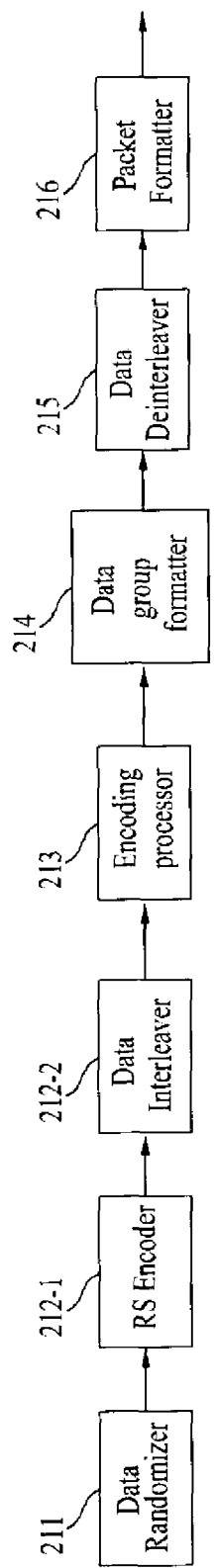
FIG. 3 illustrates a block view of a pre-processor according to another embodiment of the present invention.

FIG. 3 illustrates a block view of a pre-processor 110 according to another embodiment of the present invention. The pre-processor 110 may include a data randomizer 211, an RS frame encoder 212-1, a data deinterleaver 212-2, an encoding processor 213, a data group formatter 214, a data deinterleaver 215, and a packet formatter 216.

According to this embodiment of the present invention, the RS encoder 212-1 and the data interleaver 212-2 are positioned between the data randomizer 211 and the encoding processor 213. Herein, the data randomizer 211, the encoding processor 213, the data group formatter 214, the data deinterleaver 215, and the packet formatter 216 of FIG. 3 are identical to the data randomizer 211, the encoding processor 213, the data group formatter 214, the data deinterleaver 215, and the packet formatter 216 of FIG. 2.

In this case, the RS encoder 212-1 performs RS-encoding on each of the randomized mobile service data packets, so as to add RS parity data to each packet. For example, 20 bytes of RS Parity data may be added to each of the mobile service data packets. Thereafter, the RS parity data-added mobile service data packets are interleaved by the data interleaver 212-2, thereby being outputted to the encoding processor 213.

Figure 4:
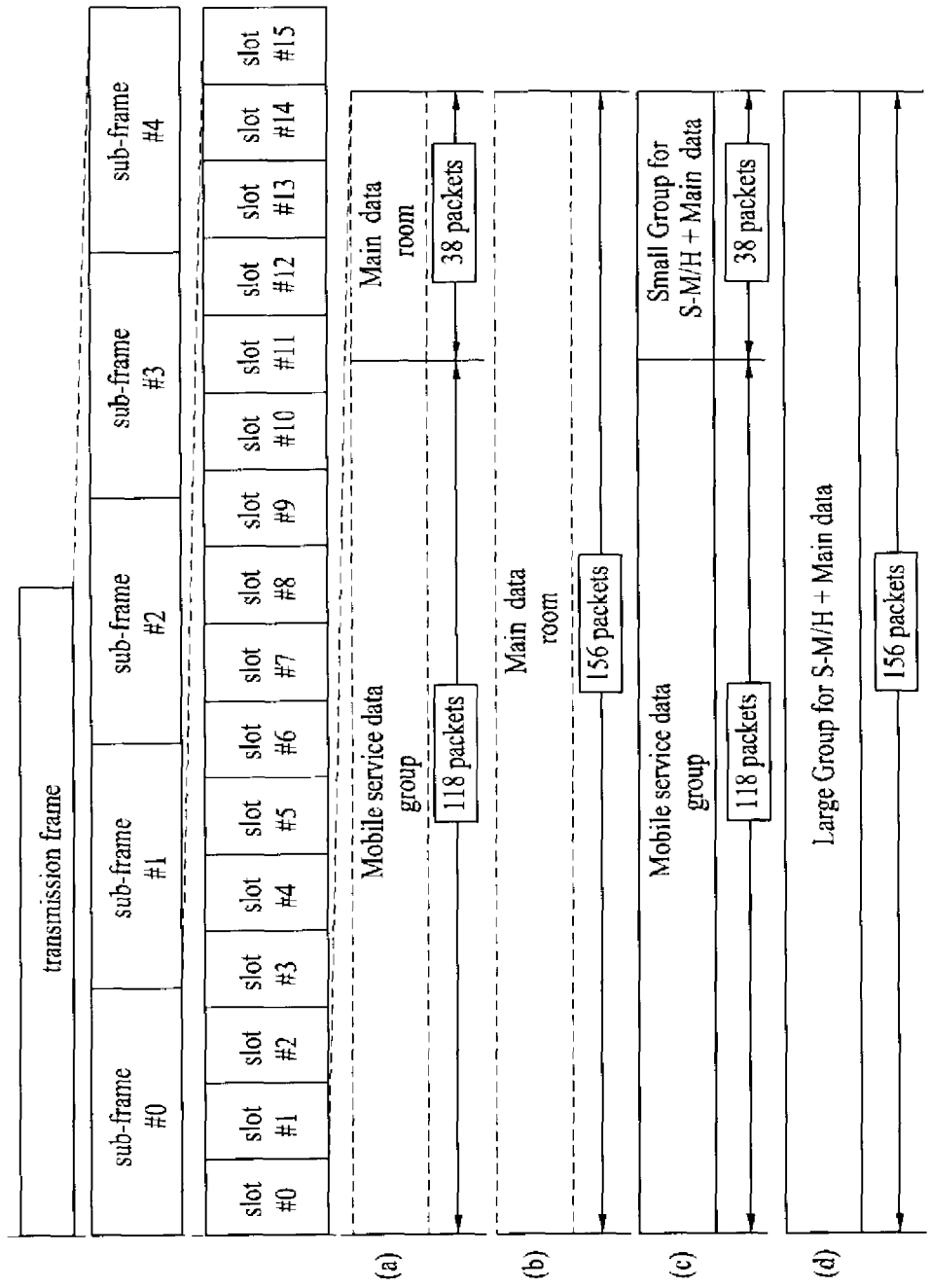
FIG. 4 illustrates exemplary M/H frame structure and data group format for transmitting and receiving mobile service data according to the present invention.

FIG. 4 illustrates an exemplary transmission frame structure and an exemplary mobile service data group format according to an embodiment of the present invention.

As shown in the upper portion of the example of FIG. 4, one transmission frame includes sub-frames, and each sub-frame may include 16 slots. In a packet level, one slot may consist of 156 data packets (i.e., transport stream packets), and in a symbol level, one slot may include 156 data segments. One data set may include 207 data bytes. Herein, the number of packets is arbitrary and may be modified depending upon the intentions of the system designer. The present invention will be described based upon an example including 156 packets.

A slot corresponds to a time period for transmitting mobile service data. Herein, each slot may include the mobile service data and main data included in the data packets.

(a) of FIG. 4 corresponds to an exemplary embodiment wherein the first 118 data packets include mobile service data packets, and wherein the remaining 38 data packets include main data packets. And, (b) of FIG. 4 corresponds to an exemplary embodiment wherein the entire 156 packets include main data.

When a maximum number of mobile service data packets are transmitted to a single slot, a full channel capability may be realized. Therefore, this may be more advantageous in a mobile service data transmission environment.

Accordingly, based upon the intentions of the designer of the system according to the present invention, the number of main data packets is limited on a scalable basis within a slot, and the remaining packets are designed to include mobile service data groups. In this case, since the number of packets including the mobile service data groups is scalable, such mobile service data groups may be referred to as Scalable mobile service data groups (or S-mobile data groups).

(c) of FIG. 4 corresponds to an exemplary embodiment wherein a first scalable number of mobile service data packets and a second scalable number of main data packets are included in the 38 packets shown in the exemplary embodiment (a). In the description of the present invention, a mobile service data group included in the first scalable number of packets may be referred to as a small group.

The sum of the first scalable number and the second scalable number has a specific (or specified) value. Also, each of the first scalable number and the second scalable number has a specified value. In this embodiment of the present invention, the sum of the first scalable number and the second scalable number is equal to 38. Accordingly, the first scalable number and the second scalable number may have the following values.

| First scalable number | Second scalable number |
|---|---|
| 11 | 27 |
| 20 | 18 |
| 29 | 9 |
| 38 | 0 |

(d) of FIG. 4 corresponds to an exemplary embodiment wherein the first scalable number of mobile service data packets and the second scalable number of main data packets are included in the entire 156 packets including the 118 packets, which are assigned (or allocated) in order to transmit the mobile service data group, in addition to the 38 packets shown in example (a). Depending upon the intentions of the system designer, the main data service packets may be periodically or aperiodically inserted in the 156 packets. In this embodiment of the present invention, the first scalable number of mobile service data packets included in the 156 packets may be referred to as a large group.

By scalably modifying the main data packets according to the intentions of the system designer, when receiving fixed main data packets, as shown in (a) of FIG. 4, a data shortage, which may occur in a buffer within a main data decoder, may be prevented, and a full channel capability may be realized. Therefore, a more advantageous mobile service data transmitting environment may be established.

Based upon the characteristics of such data groups, according to the embodiment of the present invention, the packet formatter 216 generates the mobile service data packets of the 118 packets and the mobile service data packets of the first scalable number of packets. And, the packet MUX 120 performs multiplexing on mobile service data packets being outputted from the packet formatter 216 and the main data packets of the second scalable number of packets.

Figure 5:
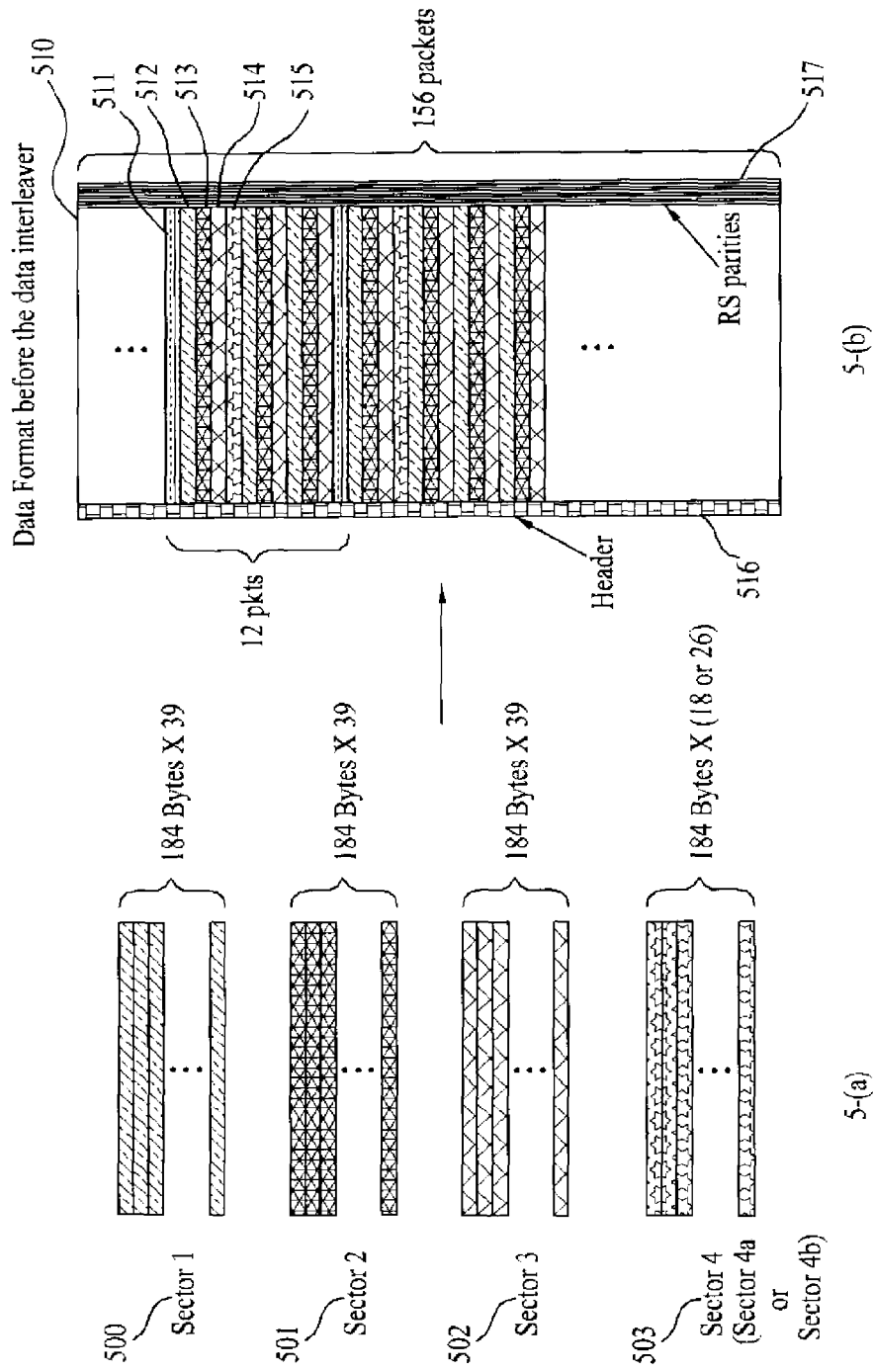
FIG. 5 illustrates an exemplary data group being generated from a data group formatter 216 of FIG. 2.

FIG. 5 illustrates an exemplary data group being generated from a data group formatter 216 of FIG. 2.

5-(a) of FIG. 5 illustrates a scalable mobile service data group included in a data group 510. Herein, the scalable mobile service data group includes a plurality of sectors. A sector corresponds to a configuration unit of a scalable mobile service data group, wherein the sector includes a specific number of mobile service data packets. The number of packets or the number of sectors may be modified in accordance with the intentions of the system designer. This embodiment of the present invention describes a case wherein a scalable mobile service data group includes 4 sectors.

Each of the 4 sectors may be referred to as sector 1 (500), sector 2 (501), sector 3 (502), and sector 4 (503). Herein, since the payload of sector 1 (500), sector 2 (501), and sector 3 (502) corresponds to 184 bytes, and includes 39 mobile service data packets, the size of each payload is equal to 184×39 bytes.

Conversely, sector 4 (503) may have the size of 184×26 bytes. This is because a region for transmitting a main data packet within the Mobile Data group may be allocated (or assigned). The main data packets may have a specific (or specified) number. And, depending upon the specific number of main data packets, sector 4 may be divided into 2 different types.

When the number of main data packets is equal to 8, sector 4 may be referred to as sector 4a. And, in this case, sector 4a may be configured of 184×18 bytes. Otherwise, sector 4 may alternatively be referred to as sector 4b. And, in this case, sector 4b may be configured of 184×26 bytes. Each of the sectors may be periodically inserted in a 4-packet unit in the scalable mobile service data group. The number of the main data packets is not limited only to the example presented herein. Therefore, the number of the main data packets may vary according to the intentions of the system designer.

5-(b) of FIG. 5 illustrates an example wherein each of sector 1, sector 2, sector 3, and sector 4 within the data group 510 is allocated (or assigned) to a respective region in the order of sector 1, sector 2, sector 3, sector 4, sector 1, sector 2, . . . .

At this point, a known data sequence (or known data packet) may be inserted in a cycle period of 12 packets. Herein, the data group 510 may include regions following the order of a region (511) being assigned with a known data packet, a region (512) being assigned with sector 1, a region (513) being assigned with sector 2, a region (514) being assigned with sector 3, a region (515) being assigned with sector 4, a region being assigned with sector 1, a region being assigned with sector 2, a region being assigned with sector 3, a region being assigned with sector 4, a region being assigned with sector 1, a region being assigned with sector 2, a region being assigned with sector 3, a region being assigned with a known data packet, . . . .

Referring to the 4-packet cycle period, the sector 4 packet and the known data packet may be assigned to the region of the same order. Therefore, the sector packet may be configured to have a relatively smaller amount of data (or data size) as compared to the other sectors.

Furthermore, a region (516) for 3 bytes of MPEG header may be assigned to the front (or beginning) portion of the data group 510, and a region (517) for 20 bytes of RS parity data may be assigned to the end portion of the mobile service data group 510. Depending upon the intention of the system designer, mobile service data may be assigned (or allocated) to the region (516) for 3 bytes of MPEG header and the region (517) for 20 bytes of RS parity data.

Figure 6:
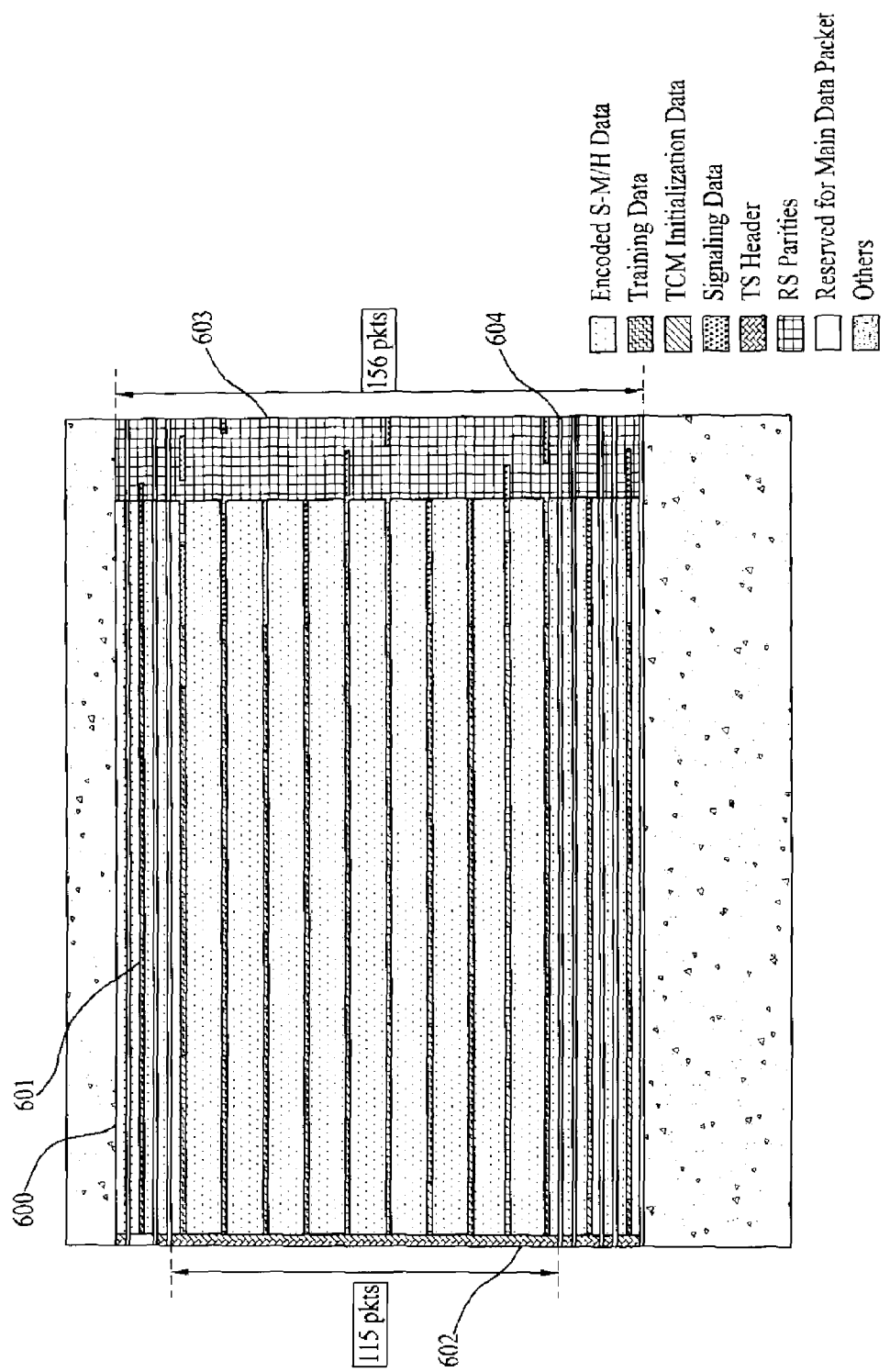
FIG. 6 illustrates another exemplary data group being generated from a data group formatter 216 of FIG. 2.

FIG. 6 illustrates another exemplary data group being generated from a data group formatter 216 of FIG. 2.

In this embodiment of the present invention, the data group 600 of 156 packets includes a region (604) for allocating (or assigning) a scalable mobile service data group and a main service data packet. The front (or beginning) portion of the data group 600 corresponds to a region (602) for assigning (or allocating) 3 bytes of the MPEG TS header, and the end portion of the data group 600 corresponds to a region (603) for assigning 20 bytes of the RS parity data. According to this embodiment of the present invention, the number of regions (604) for assigning the main data service packet is scalable, and, in the example presented in this embodiment, the number of the corresponding regions (604) is equal to a total of 8 regions. Herein, the position of the region for allocating the main data service packet is not limited.

When connected to (or concatenated with) another data group, since main data service packets are assigned to the connected (or concatenated) portion of the other data group, the data group 600 according to this embodiment of the present invention is inserted starting from the mobile service data packet, and not from the known data packet 601. The allocation position of the known data packet 601 within the data group 600 is not limited and may, therefore, vary in accordance with the intentions of the system designer.

This embodiment of the present invention corresponds to a case wherein 3 main data packets are assigned to the upper portion of the data group 600, and wherein 5 main data packets are assigned to the lower portion of the data group 600. Herein, the maximum distance between each main data packet within the mobile data group 600 may be equal to 115 packets.

Also, depending upon the intentions of the system designer, mobile service data may be inserted in the region (602) for assigning the MPEG TS header and in the region (603) for assigning 20 bytes of the RS parity data.

Figure 7:
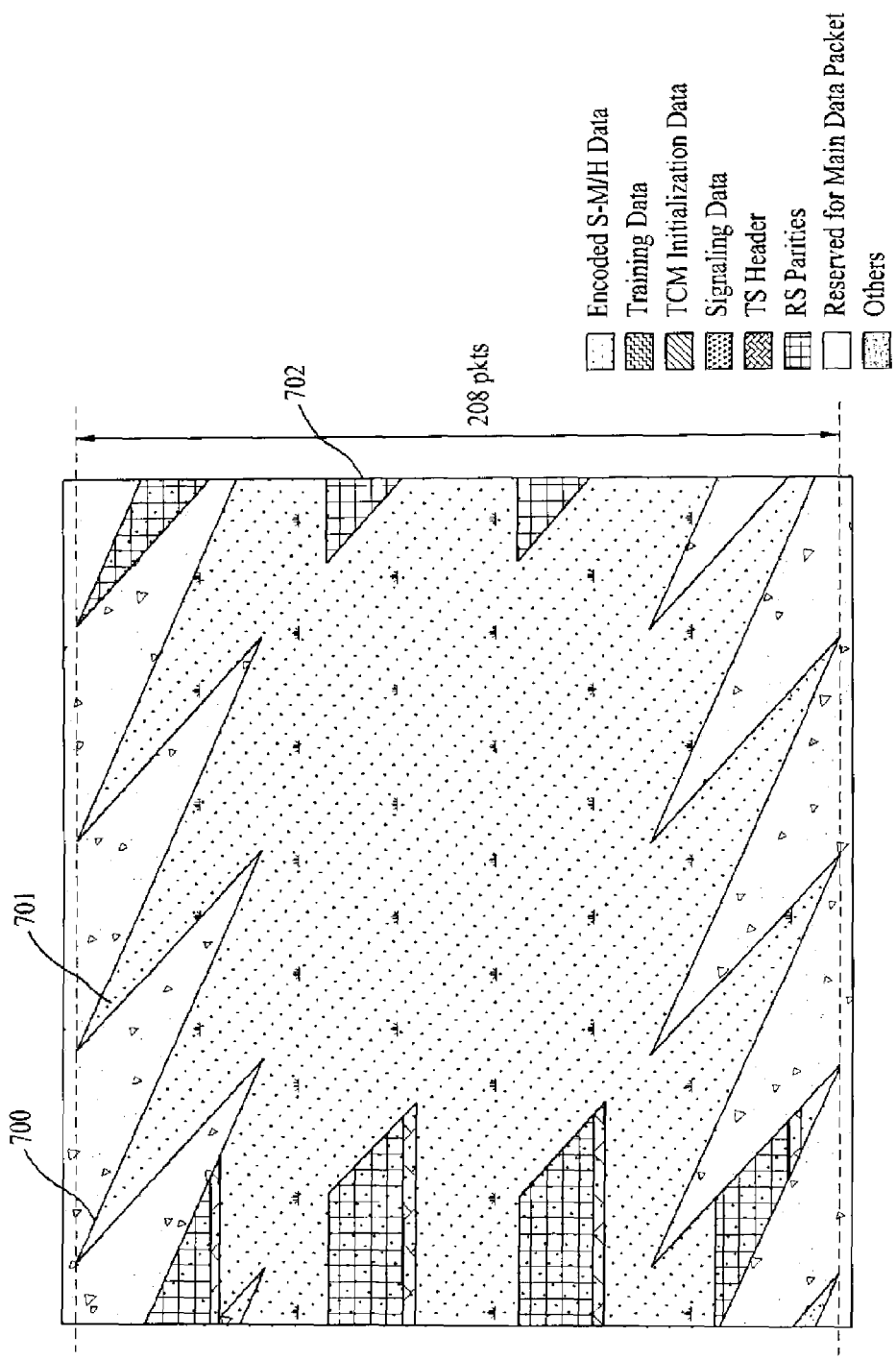
FIG. 7 illustrates an example of the data group of FIG. 6 being processed with interleaving by the data interleaver 133 of FIG. 1.

FIG. 7 illustrates an example of the data group of FIG. 6 after being processed with interleaving by the data interleaver 133 of FIG. 1.

This embodiment of the present invention shows an example of a data group 700 being processed with an interleaving process, wherein known data bytes originated from the known data sequence are dispersed in the form of spots (or are spotted) throughout the entire data group 700 being processed with interleaving. The channel equalizing performance (or capability) of the receiver may be enhanced through a known data sequence being uniformly dispersed (or distributed) as described above. Also, depending upon the intentions of the system designer, the known data bytes 701 may also be consecutively dispersed (or scattered or distributed) within the data group 700 being processed with interleaving.

When mobile service data inserted in the region (603) for assigning the 20 bytes of RS parity data of FIG. 6, the RS parity region 702 within the interleaved data group 700 includes the mobile service data packets.

Figure 8:
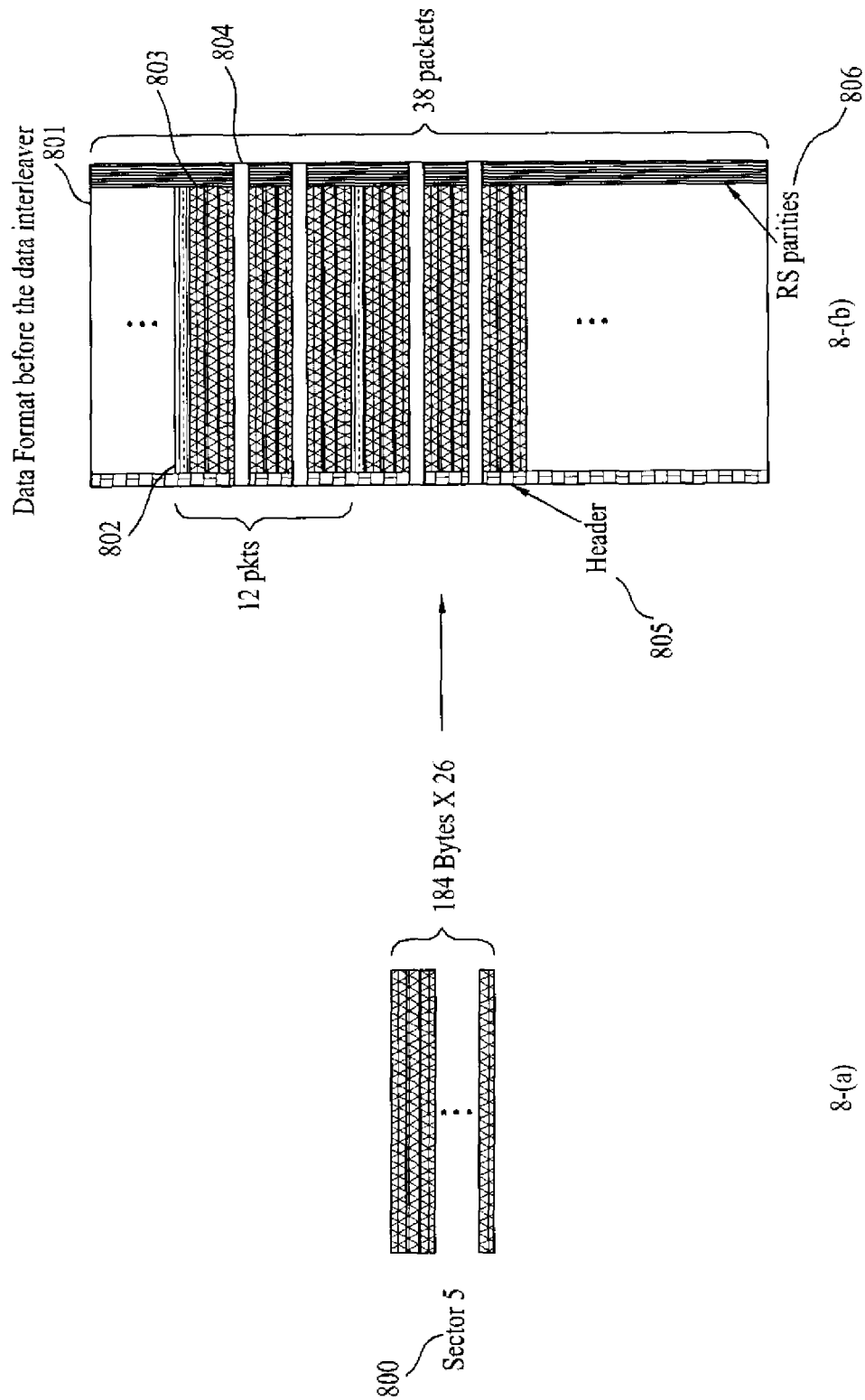
FIG. 8 illustrates yet another exemplary data group being generated from a data group formatter 216 of FIG. 2.

FIG. 8 illustrates yet another exemplary data group being generated from a data group formatter 216 of FIG. 2.

8-(*a*) of FIG. 8 illustrates a scalable mobile service data group that is to be included in the data group 801. Herein, the scalable mobile service data group may include one sector including 26 mobile service data packets. According to this embodiment of the present invention, a sector corresponds to a configuration unit of the scalable mobile service data group. Herein, the sector may have the size of 184×26 bytes. The number and size of the sector may vary depending upon the intentions of the system designer. However, in the example given in this embodiment of the present invention, the corresponding sector will be referred to as sector 5 for simplicity.

As shown in 8-(*b*) of FIG. 8, a region (802) being assigned with a known data sequence, a region (803) being assigned with sector 5, a region being assigned with sector 5, a region being assigned with sector 5, a region (804) being assigned with main data packets, a region being assigned with sector 5, a region being assigned with sector 5, a region being assigned with sector 5, a region being assigned with main data packets, sector 5, sector 5, sector 5, a known data sequence, . . . , may be assigned (or positioned) within the data group 801 by the above-described periodic order.

Therefore, according to the embodiment of the present invention, 3 (Sector 5)'s may be positioned in a cycle period of 4 packets, and a known data sequence or main data service packets may be inserted in the remaining region (803). Furthermore, the positioning order may vary periodically or aperiodically depending upon the intentions of the system designer.

Figure 9:
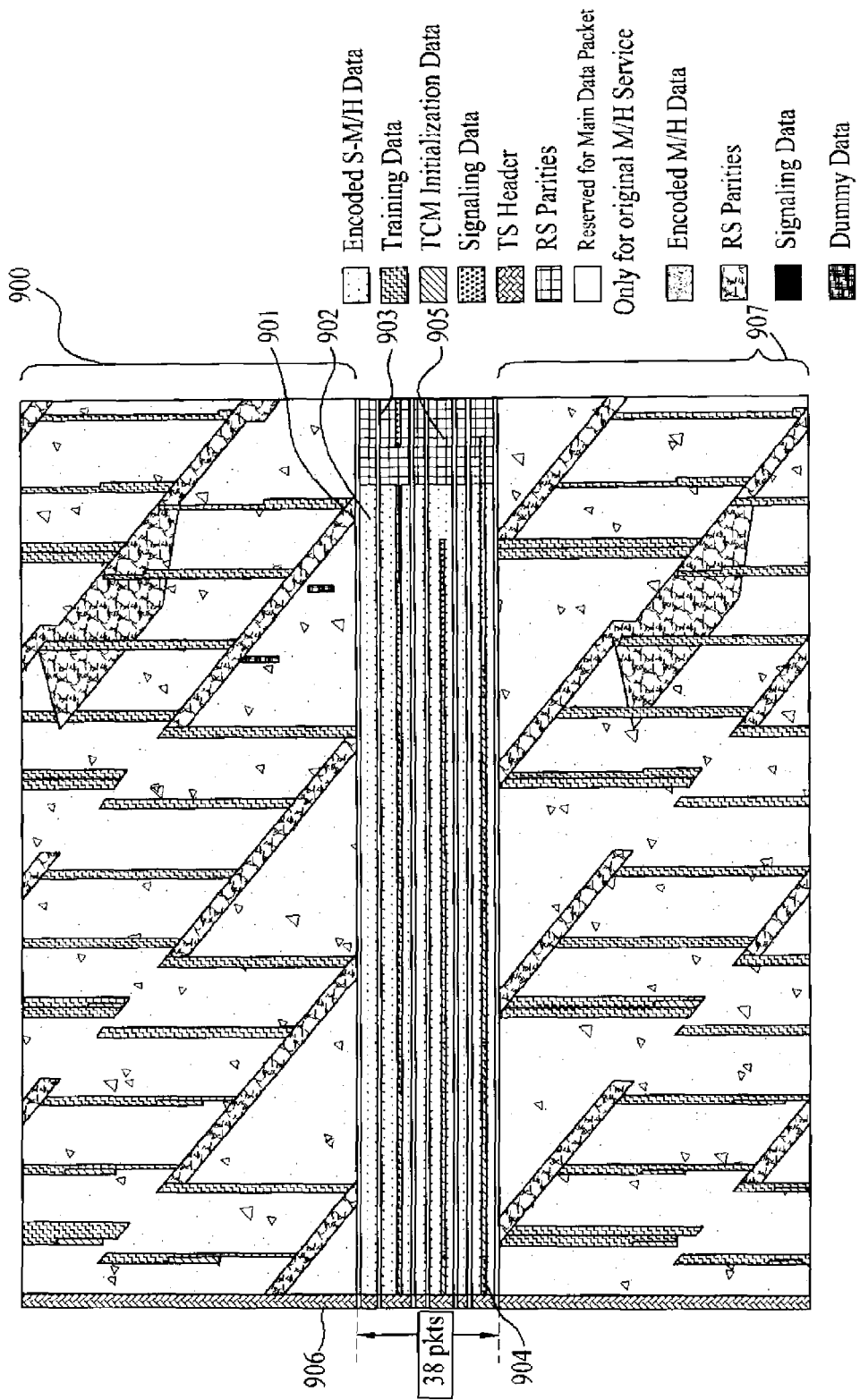
FIG. 9 illustrates yet another exemplary data group being generated from a data group formatter 216 of FIG. 2.

FIG. 9 illustrates yet another exemplary data group being generated from a data group formatter 216 of FIG. 2.

FIG. 9 illustrates an example wherein a mobile service data group 900 and a mobile service data group 907 are respectively connected to (or concatenated with) the upper side (or portion) and the lower side (or portion) of the data group 901 of 38 packets (or 38-packet data group). Herein, the mobile service data group 900 and the mobile service data group 907 may include a variable number of packets, wherein the number of packets may vary depending upon the intentions of the system designer. And, in the example given in this embodiment of the present invention, the number of packets included in the mobile service data group 900 and the mobile service data group 907 is equal to 118. The data group 901 of 38 packets may include a region (903) assigned (or allocated) for transmitting a first scalable number of mobile service data packets 902 and a second scalable number of main data service packets.

The sum of the first scalable number and the second scalable number is equal to 38, and this sum may also vary depending upon the intentions of the system designer. Furthermore, each of the first scalable number and the second scalable number may have a specified (or specific) value depending upon the intentions of the system designer. And, in this embodiment of the present invention, the second scalable number is equal to 9. Therefore, the data group according to this embodiment of the present invention may include 118+x number (i.e., first scalable number) of packets.

The front (or beginning) portion of each of the mobile service data group 900 and 907 and the data group 901 of 38 packets corresponds to a region (906) for allocating the MPEG header, and the end portion of the data group 901 of 38 packets corresponds to a region (905) for allocating RS parity data. Depending upon the intentions of the system designer, mobile service data may be inserted in the region (906) for allocating the MPEG header and in the region (905) for allocating RS parity data.

Additionally, the data group 901 of 38 packets may also include known data sequences 904. Herein, depending upon the intentions of the system designer, the known data sequences 904 may be inserted in the data group 901 of 38 packets without limitation. In the example given in this embodiment of the present invention, a total of 3 known data sequences 904 are inserted in the data group 901 of 38 packets in a vertical direction starting from the $10^{th}$ packet at a 12-packet cycle period.

Figure 10:
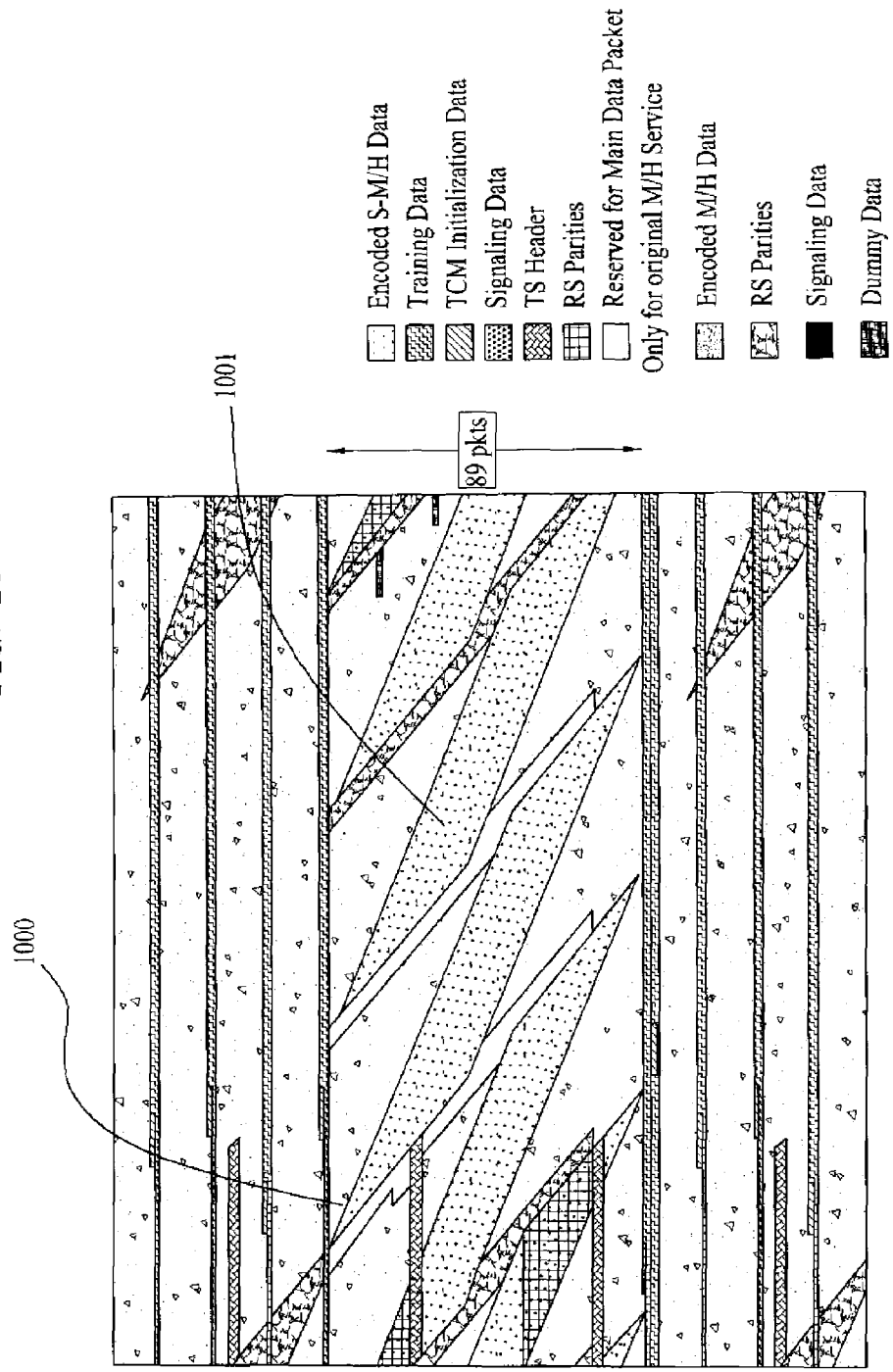
FIG. 10 illustrates an example of the data group of FIG. 9 being processed with interleaving by the data interleaver 133 of FIG. 1.

FIG. 10 illustrates an example of the data group of FIG. 9 being processed with interleaving by the data interleaver 133 of FIG. 1.

This embodiment of the present invention shows an example of a data group 1000 of 38 packets being processed with an interleaving process, wherein known data bytes 1001 originated from the known data sequence are dispersed in the form of spots (or the known data bytes are spotted). Herein, the channel equalizing performance (or capability) of the receiver may be enhanced through the known data sequence being uniformly dispersed (or distributed) as described above. Also, depending upon the intentions of the system designer, the known data bytes 1001 may also be consecutively dispersed (or scattered or distributed) within the data group 1000 being processed with interleaving.

Figure 11:
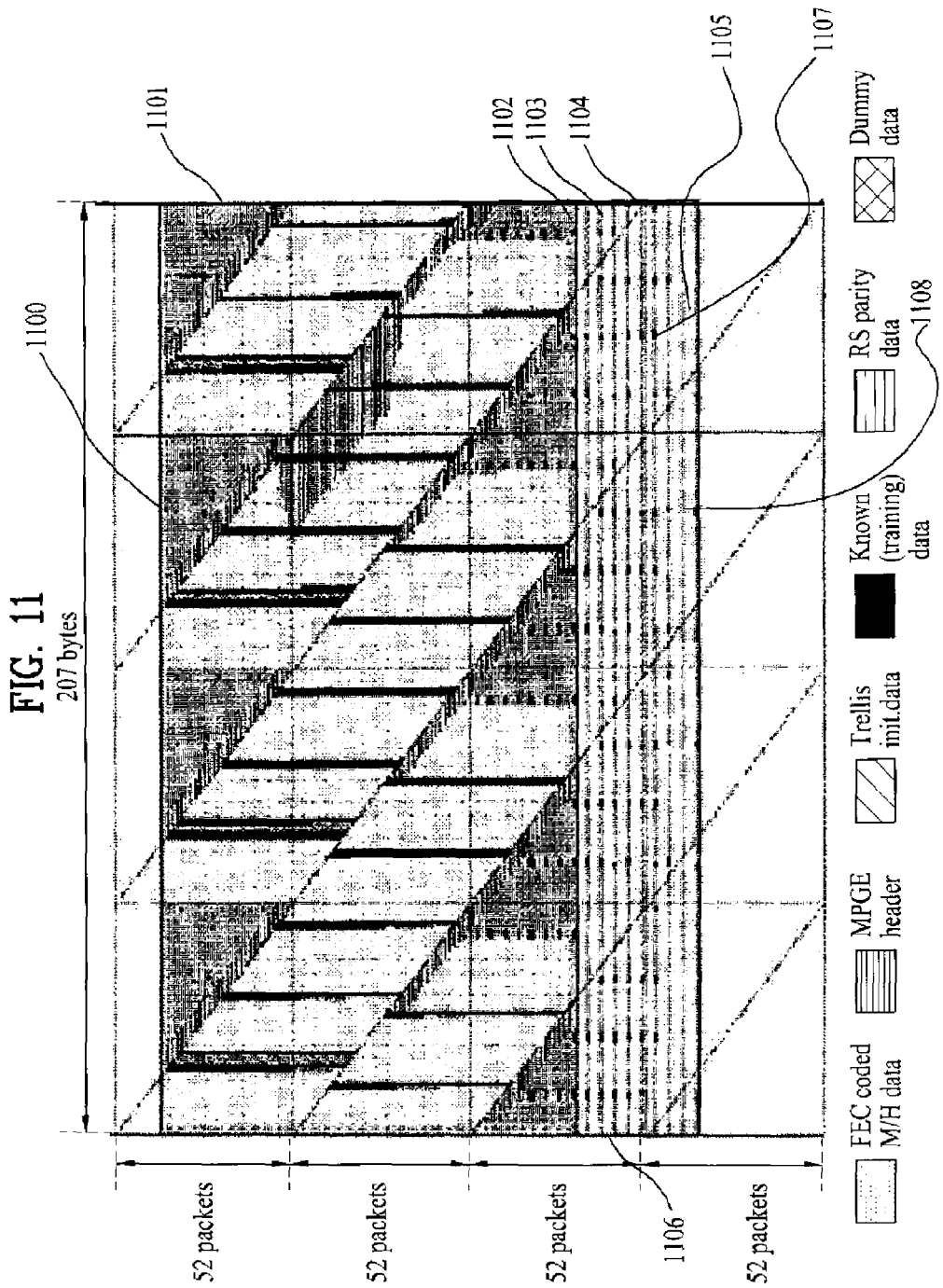
FIG. 11 illustrates yet another exemplary data group being generated from a data group formatter 216 of FIG. 2.

FIG. 11 illustrates yet another exemplary data group being generated from a data group formatter 216 of FIG. 2. As shown in FIG. 11, the data group 1100 has the size of 207 bytes, and the data group 1100 may include 118 mobile service data packets 1101 and a data group 1102 of 38 packets. Herein, the number of packets included in the data group 1102 may vary depending upon the intentions of the system designer. Also, depending upon the intentions of the system designer, known data sequences may be inserted in the mobile service data packet 1101 without limitation. According to the embodiment of the present invention, the data group 1100 includes 156 packets.

The data group 1102 of 38 packets may include the FEC-coded mobile service data 1103, a region (1104) for the RS parity bytes, trellis initialization bytes 1105, a region (1106) for MPEG TS header bytes, known (training) data bytes 1107, regions (1108) for signaling data bytes and for main data packets. Depending upon the intentions of the system designer, the region (1104) for the RS parity bytes may be included at the end portion of the data group 1102 of 38 packets. Furthermore, depending upon the intentions of the system designer, the FEC-coded mobile service data 1103 may be included in a first scalable number of packets, and the region (1108) for the main data packet may be included in a second scalable number of packets. According to the embodiment of the present invention, the sum of the first scalable number and the second scalable number is equal to 38. According to the embodiment of the present invention, the second scalable number is equal to 9.

Figure 12:
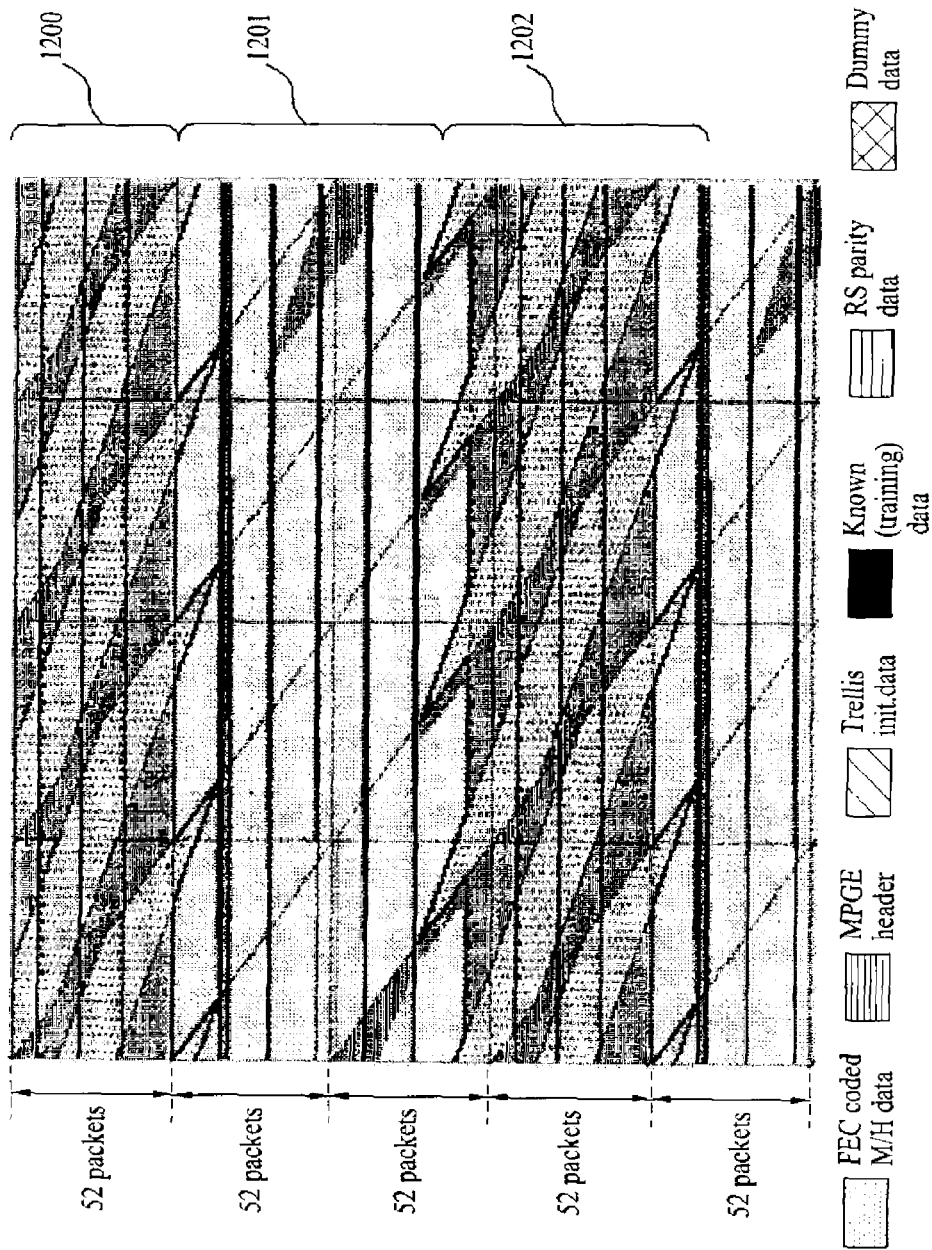
FIG. 12 illustrates an example of the data group of FIG. 11 being processed with interleaving by the data interleaver 133 of FIG. 1.

FIG. 12 illustrates an example of the data group of FIG. 11 being processed with interleaving by the data interleaver 133 of FIG. 1. In this example, data groups 1200 and 1202 of 38 packets are respectively connected to (or concatenated with) the upper and lower sides (or portions) of the mobile data packet 1202.

Figure 13:
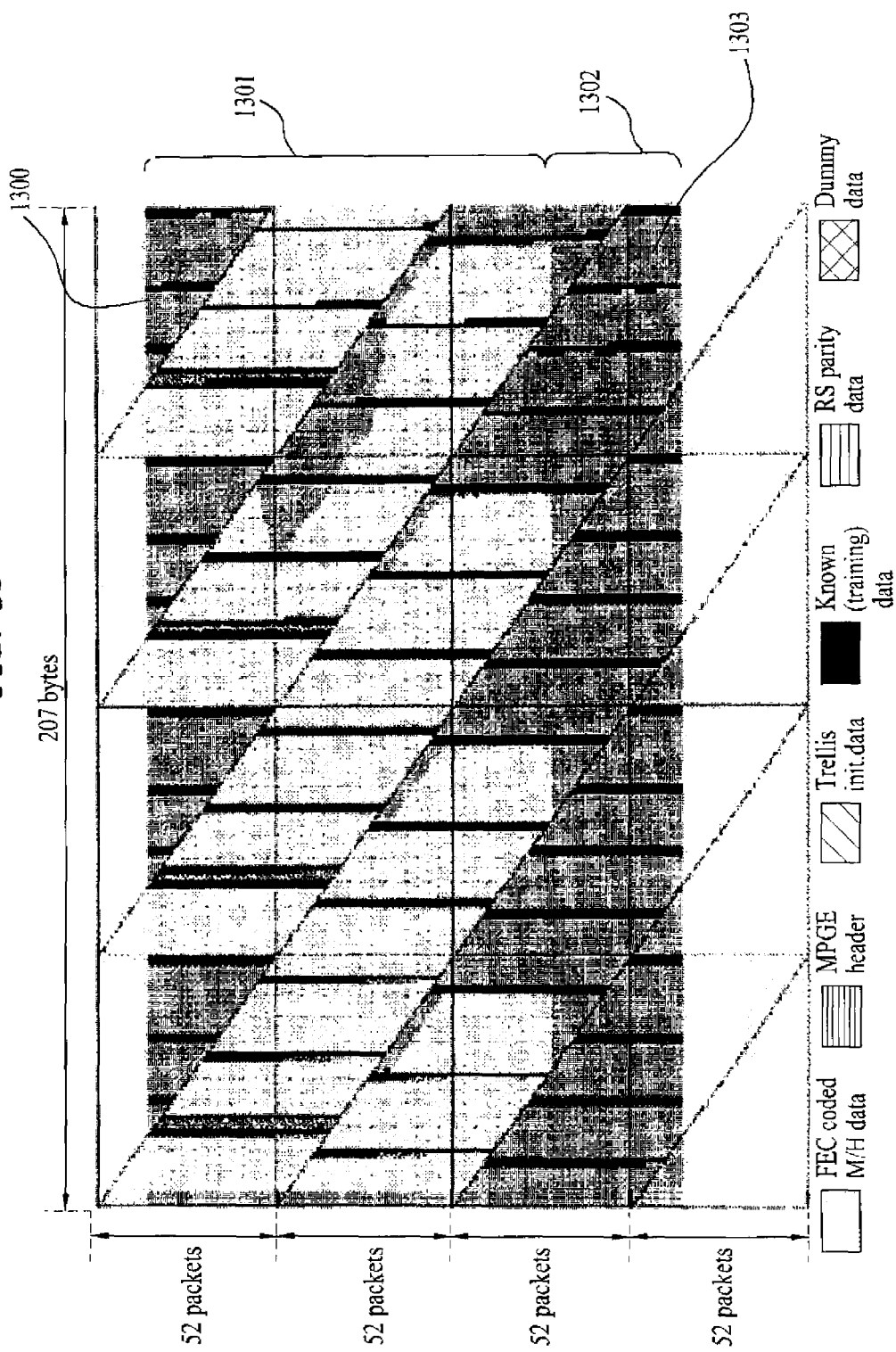
FIG. 13 illustrates yet another exemplary data group being generated from a data group formatter 216 of FIG. 2.

FIG. 13 illustrates yet another exemplary data group being generated from a data group formatter 216 of FIG. 2. As shown in FIG. 13, the data group 1300 has the size of 207 bytes, and the data group 1300 may include 118 mobile service data packets 1301 and a data group 1302 of 38 packets. Herein, the number of packets included in the data group 1302 may vary depending upon the intentions of the system designer. Also, depending upon the intentions of the system designer, known data sequences may be inserted in the mobile service data packet 1301 without limitation. According to the embodiment of the present invention, the data group 1300 includes 156 packets.

The data group 1302 of 38 packets may include the FEC-coded mobile service data 1303 and known (training) data bytes 1307. Therefore, in the data group 1302 of FIG. 13, mobile service data 1303 are included in the region (1104) for the RS parity bytes, the region (1106) for MPEG TS header bytes, ..., and the region (1108) for main data packets that are included in the data group 1102 of 38 packets shown in FIG. 11. In this case, the number of main data packets is equal to 0.

Figure 14:
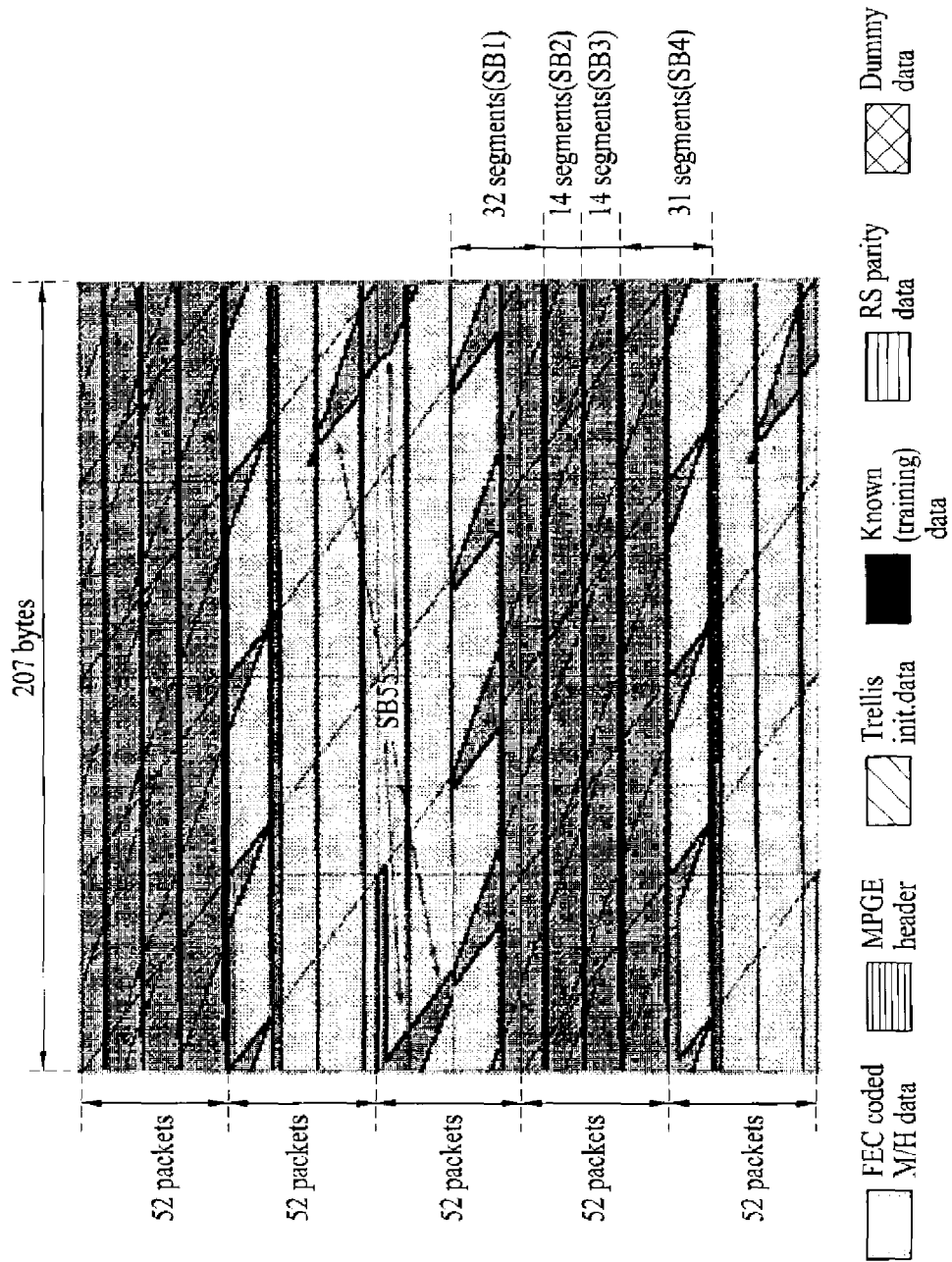
FIG. 14 illustrates an example of the data group of FIG. 13 being processed with interleaving by the data interleaver 133 of FIG. 1.

FIG. 14 illustrates an example of the data group of FIG. 13 being processed with interleaving by the data interleaver 133 of FIG. 1.

Figure 15:
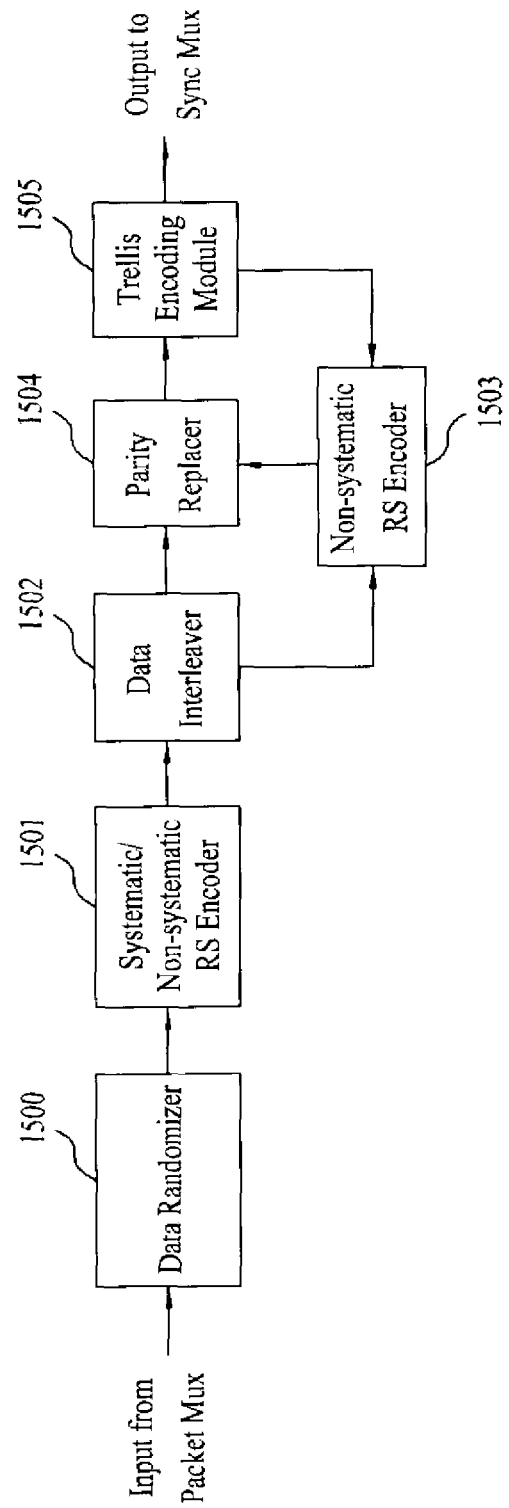
FIG. 15 illustrates a block view showing the structure of a post-processor according to an embodiment of the present invention.

FIG. 15 illustrates a block view showing the structure of a post-processor 130 according to an embodiment of the present invention. Referring to FIG. 15, the post-processor 130 may include a data randomizer 1500, a Systematic/non-systematic RS encoder 1501, a data interleaver 1502, a non-systematic RS encoder 1503, a parity replacer 1504, and a Trellis Encoding Module 1505. Herein, the data randomizer 1500, the Systematic/non-systematic RS encoder 1501, the data interleaver 1502, the non-systematic RS encoder 1503, the parity replacer 1504, and the Trellis Encoding Module 1505 respectively perform the same functions as the modified data randomizer 131, the RS encoder 132, the Data interleaver 133, the non-systematic RS encoder 134, the parity replacer 135, the trellis encoding module 136 shown in FIG. 1.

However, in case mobile service data are inserted in all of the region for allocating the MPEG Header, the region for allocating the RS Parity data (or RS parities), and the region for allocating the main data within the data group configured by the data group formatter 214 of FIG. 2, the data group created (or generated) by the data group formatter 214 is configured only of the mobile service data.

In this case, since there is no interference from the main data, the data randomizer 1500 and the Systematic/non-systematic RS encoder 1501 may respectively by-pass the randomizing process and the systematic RS encoding process. And, since there is no reason to replace the recalculated RS parity for backward compatibility, the non-systematic RS encoding process may also be by-passed. Accordingly, the Parity replacer 1504 and the non-systematic RS encoder 1503 may also by-pass the respective functions.

Figure 16:
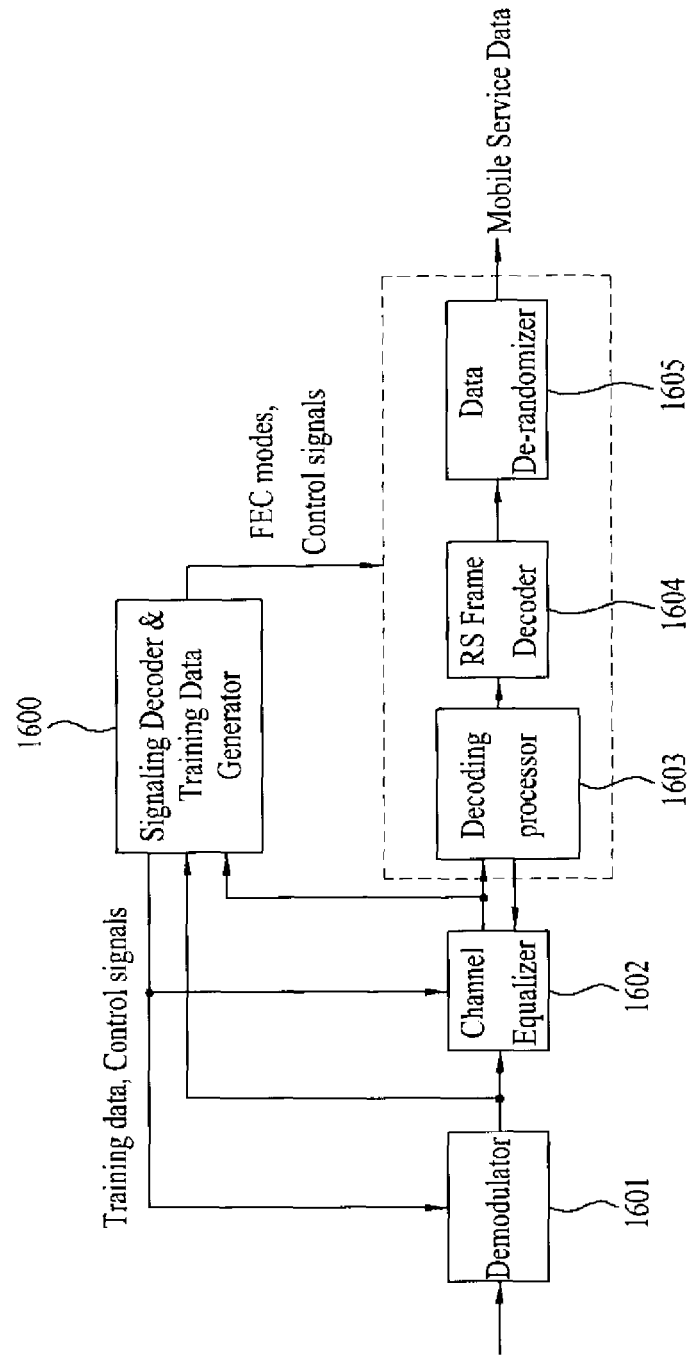
FIG. 16 illustrates a block view showing the structure of a demodulating block within a receiving system according to an embodiment of the present invention.

FIG. 16 illustrates a block view showing the structure of the demodulating unit included in the receiving system according to an embodiment of the present invention. The demodulating unit of FIG. 16 uses the known data sequences, which are transmitting from the transmitting system by being uniformly dispersed (or distributed), so as to perform carrier wave synchronization recovery, frame synchronization recovery, and channel equalization, thereby enhancing the receiving performance.

In order to do so, the demodulating unit according to the present invention may include a controller 1600, a demodulator 1601, a channel equalizer 1602, a decoding processor 1603, an RS frame decoder 1604, and a data derandomizer 1605. When required, in order to process the main service data, the demodulating unit according to the present invention may further include a data deinterleaver, an RS decoder, and a data derandomizer.

More specifically, a frequency of a specific channel, which is tuned by a tuner, is down-converted to an intermediate frequency (IF) signal, and the down-converted data are outputted to the demodulator 1601. At this point, according to the embodiment of the present invention the down-converted data pass through an Analog/Digital Converter (ADC) (not shown), which converts a passband analog IF signal to a passband digital IF signal, thereby being inputted to the demodulator 1601.

The demodulator 1601 performs self gain control, carrier wave recovery, and timing recovery processes on the inputted passband IF signal, thereby modifying the IF signal to a baseband signal. Then, the demodulator 1601 outputs the converted baseband signal to the channel equalizer 1602. The channel equalizer 1602 compensates the distortion of the channel included in the demodulated signal and then outputs the error-compensated signal to the decoding processor 1603 and the controller 1600.

The controller 1600 performs decoding on the signaling data from the data being demodulated or channel-equalized and inputted to the controller 1600, thereby providing the decoded signaling data to the necessary block. Also, the controller 1600 extracts known data sequence information from the data being demodulated or channel-equalized and inputted to the controller 1600, thereby providing the extracted known data sequence information to the necessary block. According to the embodiment of the present invention, the data being inputted to the controller 1600 has the same data group structure as that of FIG. 5.

More specifically, the controller 1600 detects positions of the known data sequences that inserted by the transmitting system so as to be uniformly distributed (or dispersed) from the received data. Thereafter, along with the detected position information, the controller 1600 outputs symbol sequences of the known data sequences that are generated from the respective positions to the demodulator 1601 and the channel equalizer 1602.

Furthermore, the controller 1600 performs decoding on the signaling data from the received data, thereby outputting the decoded signaling data to the decoding processor 1603, the RS frame decoder 1604, and the data derandomizer 1605. In addition to the known data sequence information and the signaling information, the controller 1600 generated control signals required for data processing and outputs the generated control signals to the necessary blocks.

The demodulator 1601 uses the known data symbol sequence during the timing recovery or carrier recovery, thereby enhancing the demodulating performance. Similarly, the channel equalizer 1602 uses the known data so as to enhance the equalizing performance. Moreover, the decoding result of the decoding processor 1603 may be fed-back to the channel equalizer 1602, thereby enhancing the equalizing performance. The channel equalizer 1602 may perform channel equalization by estimating a channel impulse response (CIR) so as to perform channel equalization. And, this example will be described in detail according to the embodiment of the present invention.

When the present invention uses the CIR estimated from the known data sequence section or the field synchronization section in order to perform channel equalization, one of the CIRs estimated from each section may be directly used without any modification, or a CIR newly created by interpolating or extrapolating at least a plurality of CIRs may be used.

Herein, when a value F(Q) of a function F(x) at a particular point Q and a value F(S) of the function F(x) at another particular point S are known, interpolation refers to estimating a function value of a point within the section between points Q and S. Linear interpolation corresponds to the simplest form among a wide range of interpolation operations. The linear interpolation described herein is merely exemplary among a wide range of possible interpolation methods. And, therefore, the present invention is not limited only to the examples set forth herein.

Alternatively, when a value F(Q) of a function F(x) at a particular point Q and a value F(S) of the function F(x) at another particular point S are known, extrapolation refers to estimating a function value of a point outside of the section between points Q and S. Linear extrapolation is the simplest form among a wide range of extrapolation operations. Similarly, the linear extrapolation described herein is merely exemplary among a wide range of possible extrapolation methods. And, therefore, the present invention is not limited only to the examples set forth herein.

Meanwhile, according to the embodiment of the present invention, the data being channel-equalized by the channel equalizer 1602 and inputted to the decoding processor 1603 correspond to data being processed with both encoding and trellis encoding (e.g., data within the RS frame) in the transmitting system. More specifically, according to the embodiment of the present invention, the data being inputted from the transmitting system to the data group formatter correspond to an RS frame being inputted from the transmitting system to the data group formatter. Herein, the RS frame includes mobile service data of an RS frame payload, RS parity data added to the RS frame payload, and CRC data.

More specifically, according to the embodiment of the present invention, only the known data sequences, signaling data, MPEG header, and RS Parity data included in the data group, as shown in FIG. 16, are removed, and only the data of the RS frame are inputted to the decoding processor 1603. Herein, the removal of the data may be realized (or performed) when the data are outputted from the channel equalizer 1602 and inputted to the decoding processor 1603 based upon the control of the controller 1600. Alternatively, the data removal process may also be performed by a separate block or by the controller 1600.

More specifically, when the inputted data correspond to data being encoded by the encoding processor 213 of the transmitting system and trellis-encoded by the trellis encoding module 136 of the transmitting system, the block decoder 1603 performs trellis-decoding and decoding as inverse processes of the transmitting system. At this point, the encoding processor of the transmitting system may be viewed (or considered) as an outer encoder, and the trellis encoding module of the transmitting system may be viewed as an inner encoder.

When decoding such concatenated codes, in order to maximize the decoding performance (or capability) of an outer code, it is preferable that a soft-decision value is outputted from the decoder of an inner code. Furthermore, the decoding processor 1603 receives encoding information included in the signaling data through the controller 1600. Then, the decoding processor 1603 may use the received encoding information so as to perform the decoding process. Herein, the decoding processor 1603 uses at least one of an SCCC method, a PCCC method, a variable SCCC method, and a hybrid method so as to perform decoding on the inputted data.

Figure 17:
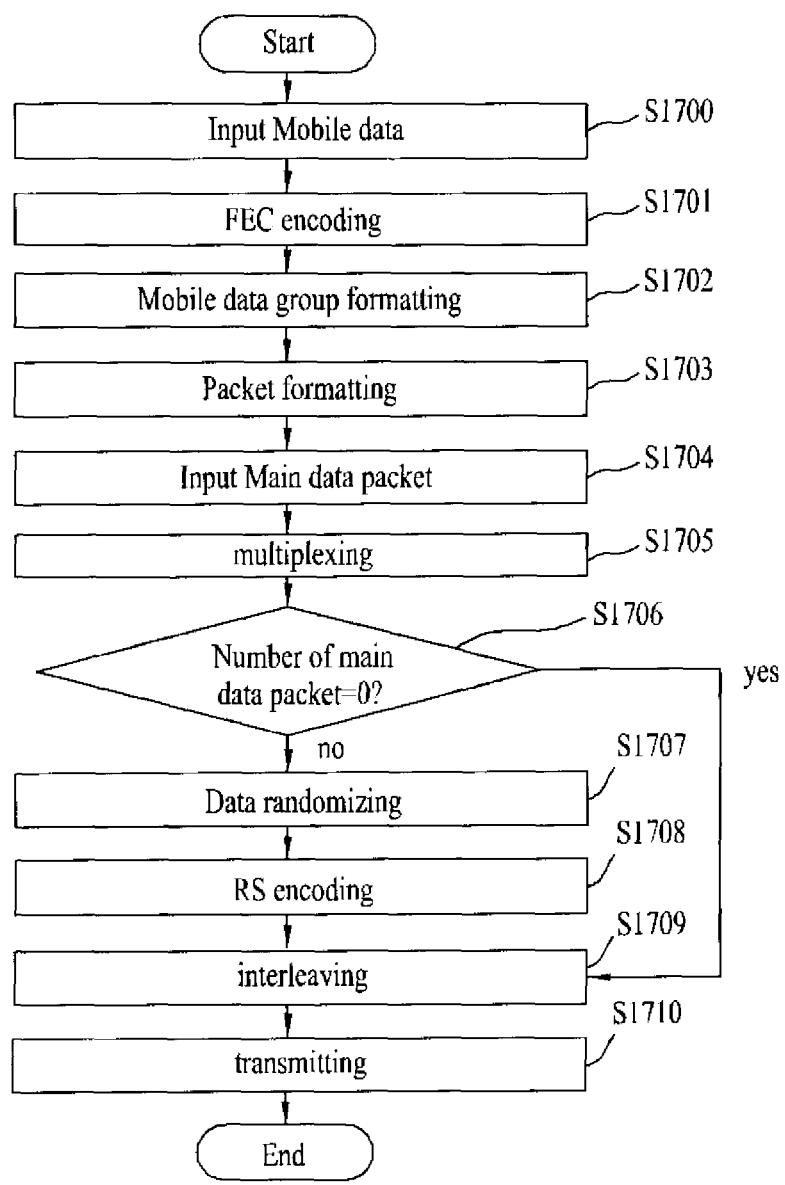
FIG. 17 illustrates a flow chart showing the exemplary operations of the transmitting system according to an embodiment of the present invention.

FIG. 17 illustrates a flow chart showing the exemplary operations of the transmitting system according to an embodiment of the present invention.

When mobile data are inputted (S1700), the RS frame encoder 212 performs an encoding process for forward error correction (FEC) on the inputted mobile data (S1701). Subsequently, the data group formatter 214 receives the encoded mobile data outputted from the RS frame encoder 212. Then, the data group formatter 214 adds known data sequences to the received mobile data so as to configure a data group (S1702).

The packet formatter 216 receives the data group outputted from the group formatter 214. Then, the packet formatter 216 uses data included in the data group so as to configure a specified number of mobile data packets and a first scalable number of mobile data packets (S1703).

When a second scalable number of main data packets is inputted (S1704), the packet MUX 120 multiplexes the mobile data packet configured by the packet formatter 216 and the second scalable number of main data packets. In this case, a sum of the first and second scalable numbers may be equal to a specified (or specific) value. Herein, the sum may vary depending upon the intentions of the system designer. Furthermore, the second scalable number also has a specified (or specific) value. In the example given according to the embodiment of the present invention, the value of the second scalable number is equal to 9 or 0.

Therefore, the transmitting system determines whether or not the second scalable number is equal to '0' (S1706). When the transmitting system determines the second scalable number to be equal to '0', the data randomizer 1500 performs data randomizing on the main data included in the multiplexed data outputted from the packet MUX 120 (S1707). Thereafter, the systematic/non-systematic RS encoder 1501 performs systematic RS encoding on the main data and performs non-systematic RS encoding on the mobile data (S1708).

If the second scalable number is equal to '0', the data randomizer 1500 and the systematic/non-systematic RS encoder 1501 may by-pass the data randomizing, systematic RS encoding, and non-systematic RS encoding processes. The data interleaver 1502 performs interleaving on the multiplexed data (S1709). Finally, the transmission unit transmits the interleaved data within a single slot (S1710).

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for transmitting a broadcast signal in a transmitter, the method comprising:
    encoding mobile data for forward error correction (FEC);
    forming a data group including the encoded mobile data and known data sequences;
    forming a specified number of mobile data packets and a first scalable number of mobile data packets using data in the data group;
    multiplexing the formed mobile data packets and a second scalable number of main data packets, wherein a sum of the first and second scalable numbers is equal to a specified value;
    interleaving data in the multiplexed main and mobile data packets; and
    transmitting the interleaved data, wherein the interleaved data are transmitted within a slot corresponding to a time period,
    wherein the second scalable number is '9' or '0' (zero), and when the second scalable number is '9', the method further comprises:
    randomizing main data in the main data packets in a randomizer: and
    performing systematic Reed-Solomon (RS) encoding on the main data and non-systematic RS encoding on the mobile data in the mobile data packets in an RS encoder.

2. The method of claim 1, wherein when the second scalable number is '0', the randomizer and the RS encoder pass over the randomizing process, the RS encoding process, and the non-systematic RS encoding process.

3. The method of claim 1, wherein the data group further includes placeholders for MPEG header, non-systematic RS parity, and main data.

4. The method of claim 3, wherein, when the second scalable number is '0', the placeholders are allocated to the encoded mobile data.

5. The method of claim 1, wherein the known data sequences are spotted in the interleaved data.

6. An apparatus for transmitting a broadcast signal in a transmitter, the apparatus comprising:
    an encoder configured to encode mobile data for forward error correction (FEC);
    a group formatter configured to form a data group including the encoded mobile data and known data sequences;
    a packet formatter configured to form a specified number of mobile data packets and a first scalable number of mobile data packets;
    a multiplexer configured to multiplex the formed mobile data packets and a second scalable number of main data packets, wherein a sum of the first and second scalable numbers is equal to a specified value;
    an interleaver configured to interleave the multiplexed main and mobile data packets; and
    a transmission unit configured to transmit the interleaved data within a slot corresponding to a time period,
    wherein the second scalable number is '9' or '0' zero and when the second scalable number is '9', the apparatus further comprises:
    a randomizer configured to randomize main data in the main data packets; and
    a Reed-Solomon (RS) encoder configured to perform systematic RS encoding on the main data and non-systematic RS encoding on the mobile data in the mobile data packets.

7. The apparatus of claim 6,
    wherein, when the second scalable number is '0', the randomizer and the RS encoder pass over the randomizing, RS encoding, and non-systematic RS encoding processes.

8. The apparatus of claim 6, wherein the data group further includes placeholders for MPEG header, non-systematic RS parity, and main data.

9. The apparatus of claim 8, wherein, when the second scalable number is '0', the placeholders are allocated to the encoded mobile data.

10. The apparatus of claim 6, wherein the known data sequences are spotted in the interleaved data.

* * * * *